(12) United States Patent
Okincha

(10) Patent No.: US 8,860,819 B2
(45) Date of Patent: Oct. 14, 2014

(54) AUTOMATED LIGHTING SYSTEM CHARACTERIZATION DEVICE AND SYSTEM

(71) Applicant: Peripheral Vision, Inc., Santa Clara, CA (US)

(72) Inventor: Michael Okincha, San Jose, CA (US)

(73) Assignee: Peripheral Vision, Inc., Santa Clara, CA (US)

( * ) Notice: Subject to any disclaimer, the term of this patent is extended or adjusted under 35 U.S.C. 154(b) by 0 days.

(21) Appl. No.: 14/150,612

(22) Filed: Jan. 8, 2014

(65) Prior Publication Data
US 2014/0192208 A1  Jul. 10, 2014

Related U.S. Application Data

(60) Provisional application No. 61/750,180, filed on Jan. 8, 2013.

(51) Int. Cl.
*H04N 17/00* (2006.01)
*H04N 17/02* (2006.01)

(52) U.S. Cl.
CPC .................. *H04N 17/002* (2013.01)
USPC ........... 348/189; 348/177; 348/188; 348/184; 348/181

(58) Field of Classification Search
USPC ......... 348/175–182, 184, 187–191, 806, 807, 348/745, 602, 603; 315/368.12; 324/403; 250/483.1; 445/2, 3, 63, 64
See application file for complete search history.

(56) References Cited

U.S. PATENT DOCUMENTS

| | | | | |
|---|---|---|---|---|
| 4,962,425 A * | 10/1990 | Rea | ............................... | 348/187 |
| 4,991,007 A * | 2/1991 | Corley | ......................... | 348/188 |
| 5,351,201 A * | 9/1994 | Harshbarger et al. | ......... | 348/187 |
| 5,821,993 A * | 10/1998 | Robinson | ...................... | 348/187 |
| 5,883,476 A * | 3/1999 | Noguchi et al. | ......... | 315/368.12 |
| 6,252,626 B1 * | 6/2001 | Buckley et al. | ............... | 348/189 |
| 6,950,109 B2 * | 9/2005 | Deering | ........................ | 345/589 |
| 7,200,497 B2 * | 4/2007 | Wang et al. | ..................... | 702/57 |
| 7,629,998 B2 * | 12/2009 | Elberbaum | ................... | 348/187 |
| 2002/0080246 A1 * | 6/2002 | Parulski | ........................ | 348/225 |
| 2004/0032496 A1 * | 2/2004 | Ebenstein et al. | ............ | 348/187 |

(Continued)

FOREIGN PATENT DOCUMENTS

JP  2005-531140 A  10/2005
KR  10-2008-0080614 A  9/2008

OTHER PUBLICATIONS

International Search Report & Written Opinion in International Patent Application No. PCT/US2014/010762, mailed Apr. 24, 2014; 14 pages.

*Primary Examiner* — Victor Kostak
(74) *Attorney, Agent, or Firm* — Fountainhead Law Group, PC

(57) ABSTRACT

Embodiments of the invention relate to digital imaging, and in particular, systems methods, and devices for testing target field illumination characteristics. Certain embodiments include a main unit that includes a controller configured to control timing indicators on a front surface of the main unit and light sensor modules attached to the periphery the front surface. The main unit can be configured to accept an image quality test chart. The light sensors can be configured to be coupled to the periphery of the image quality test chart or coupled to extended wired or wireless connections to provide flexible field of view placement. The display includes LED or LCD timing indicators.

11 Claims, 16 Drawing Sheets

(56) References Cited

U.S. PATENT DOCUMENTS

| | | |
|---|---|---|
| 2005/0037815 A1 | 2/2005 | Besharat et al. |
| 2006/0038927 A1* | 2/2006 | Saletta .......................... 348/745 |
| 2008/0265799 A1 | 10/2008 | Siebert |
| 2008/0316318 A1* | 12/2008 | Hoffman ....................... 348/177 |
| 2009/0203999 A1* | 8/2009 | Rust et al. ..................... 600/443 |
| 2011/0204793 A1 | 8/2011 | Gardner |
| 2012/0092541 A1* | 4/2012 | Tuulos et al. ............ 348/333.01 |
| 2012/0182276 A1* | 7/2012 | Kee ............................... 345/207 |

\* cited by examiner

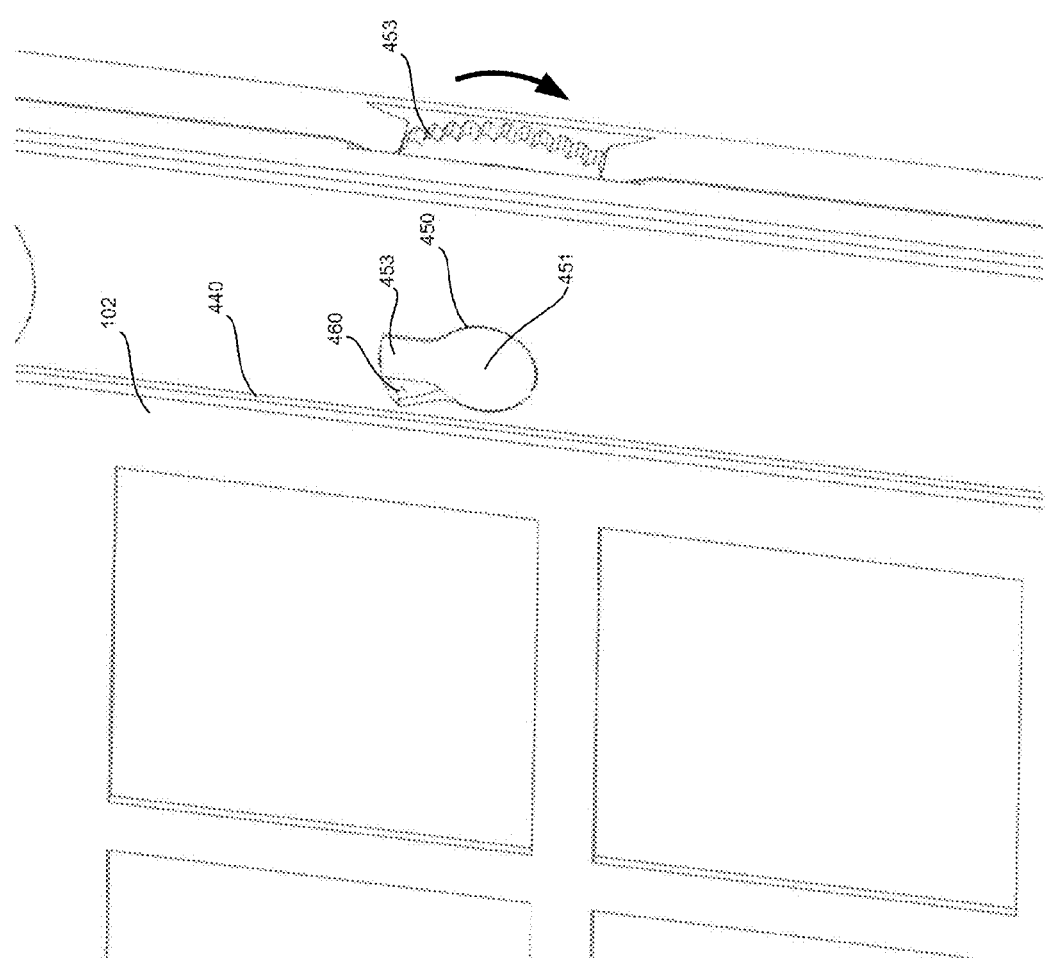

AUTOMATED LIGHTING SYSTEM CHARACTERIZATION DEVICE AND SYSTEM

BACKGROUND

The present invention relates to digital imaging, and in particular, to systems, methods, and devices for testing, measuring, and characterizing illumination light sources and lighting systems used in the capture of test and calibration images for testing, calibration, characterization, and qualification of imaging devices, such digital cameras and digital imagers.

Unless otherwise indicated herein, the approaches described in this section are not admitted to be prior art by inclusion in this section.

Digital imaging is highly complex and involves many individual components and systems and their interactions with one another to produce a digital image. To produce a digital image of a given quality, a system integrator or system designer must account for the behavior, characteristics, and capabilities of each component in the system. From the lens and imager chip to the imager control circuits and backend image processing software, each component of a digital imaging system contributes various behaviors and nuances that affect the final digital image.

To determine the quality of the final images produced by a given digital imaging system, testers and engineers can use any number of standardized and proprietary tests to evaluate color sensitivity and reproduction, vertical and horizontal response uniformity, image noise, and other image characteristics. Many of such tests involve capturing images using a complete or nearly complete imaging system with various settings under various lighting conditions. To isolate various capabilities of a specific imaging system during testing, it is necessary to eliminate variations in the lighting systems used to characterize, test, and calibrate the imaging system.

Lighting systems can vary greatly. For instance, not only can lighting systems vary from one lighting system to another, but a particular lighting system can vary over time due to the change in color and light output as the lamps, or other light sources, warm up and cool down. Additionally, as lighting systems age, the color and illumination quality of various bulbs and lamps can change, so it is necessary to test, measure, and recalibrate lighting systems on a regular basis.

Traditional illumination testing techniques include various arduous manual processes that are labor and time intensive. Use of such manual processes and systems can cause significant delays in the testing, calibration, and production of digital imaging systems and quite often require highly trained engineers or technicians to ensure the process is performed accurately.

SUMMARY

Embodiments of the invention relate to methods, systems, and devices for testing, measuring, and calibrating lighting systems used in conjunction with digital and other imaging systems. As used herein, the term "characterization" is used to refer to any methodology used to test, measure, or calibrate lighting or imaging systems.

Embodiments of the present invention are directed toward an image quality test chart holder that includes a timing display, image data display, and light sensors modules disposed around the periphery of the image quality test chart holder. The light sensor modules can include a photo diode housed in a mounting body. In some embodiments, the mounting body of each light sensor module can be configured to be removed from the test char holder and include various mounting elements suitable for positioning the light sensor module on vertical and horizontal services as well as other mounting devices, such as threaded posts, magnetic surfaces, etc. The light sensor modules can also include an LED indicator ring disposed around the light sensor, such as a photo diode, used to indicate various timing or image specific information in a captured image without the use of metadata or an associated spreadsheet or database entry.

Other embodiments of the present invention are directed toward a flexible illumination testing device and system. Similar to the image quality test chart holder, the flexible illumination testing device can include a central module that houses a display for displaying timing and image data and a microprocessor or microcontroller for controlling the displays as well as several tethered light sensor modules. The tethered light sensor modules can be coupled to the central module via a wired or wireless connections. Using such a flexible illumination testing device, the light sensor modules can be placed in areas of interest in the frame of image to better collect localized lighting information that can be used in comparison or in contrast to measurements collected by other light sensors across the frame. In such embodiments, each light sensor module can include various types of coupling mechanisms to enable each light sensor module to be coupled to a surface in the scene of the image to distribute the light sensor modules across the frame. The light sensor modules can be located in a single plane in the scene or can be distributed amongst various planes within the scene. In such scenarios, the light sensor modules can be configured to include range finding components to determine the distance of each light sensor module from the lighting system or the imaging system. Such range finding components can include various types of optical range finders, such as laser and infrared distance meters. In other embodiments, the range finder can include sonic distance meters, while in yet other embodiments, the ranger finders can include a manual set distance measurement. In each of such embodiments, the distance from the lighting system and/or imaging system can be displayed on the central module or the periphery of each individual light sensor module.

Similarly, in other embodiments of the present invention, the timing display and the image data display can also display frame, image, digital imager system, or lighting system specific information that can be read directly from a visual representation of the digital image from the image itself. For example, the timing display can include a series of periodically blinking or running LEDs that would indicate the time or latency between the time a shutter release command is sent to the digital imaging system and the lighting system. Meanwhile the image data display can display imager settings, such as shutter speed, gain factor, white balance, etc, as well at imager identification or imaging system identification information, i.e an imager serial number or other identification number. Because the data displayed on the timing display or the image data display are disposed on a surface that can be captured at the same time as a test image is captured, such information can be read directly from the visual representation, i.e. a display of the image on a computer screen or print out, instead of referring to metadata that may or may not be preserved during various processing, calibration, correction, or other backend processes amongst various entities involved in the production of a digital imaging system.

One embodiment of the present disclosure includes an illumination characterization system comprising: a main body module comprising a display device; and a plurality of light sensor modules coupled to the main display module; wherein the display device displays information comprising measurements made by at least one of the plurality of light sensors modules.

In one embodiment, each of the light sensor modules comprises a light sensor, and wherein at least one of the light sensor modules comprises an indicator for indicating a condition measured by the corresponding light sensor.

In one embodiment, the indicator comprises one or more LEDs disposed around the light sensor in a ring or other configuration.

In one embodiment, at least one light sensor comprises a photodiode.

In one embodiment, the main body module comprises a test chart holder to accept a test chart, wherein the light sensor modules are coupled to the perimeter of the test chart holder.

In one embodiment, the test chart holder comprises one or more registration surface to align the test chart.

In one embodiment, the plurality of light sensor modules are flexibly coupled to the main body module via a plurality of wired connections, wherein the main body module sends control signals to and receives measurement signals from the plurality of light sensor module through the plurality of wired connections.

In one embodiment, the plurality of light sensor modules comprises a plurality of wireless communication interfaces, wherein the main body module comprise a wireless communication interface to establish a plurality of wireless communication sessions with the plurality of sensor modules through the plurality of wireless communication interfaces, wherein the main body module sends control signals to and receives measurement signals from the plurality of light sensor module through the plurality of wireless communication sessions.

Another embodiment of the present disclosure includes and illumination characterization device comprising: a plurality of light sensors; a display device; a processor coupled to the display device and connected to the plurality of lights sensors; and a non-volatile storage medium coupled to the processor, wherein the non-volatile storage medium comprises instructions, that when executed by the processor, cause the processer to be configured for: controlling the plurality of lights sensors to take one or more light measurements; analyzing the one or more light measurements to generate light measurement results; and rendering a visual representation of the measurement results on display device.

In one embodiment, the light measurement results comprise a description of an composite illuminance measurement comprising illuminance measurement from at least some of the plurality of light sensors.

In one embodiment, the light measurement results comprise a description of a uniformity of a lighting system.

In one embodiment, the light measurement results comprise a color characterization of a lighting system.

In one embodiment, the light measurement results further comprise a color correction information for changing the color characterization of the lighting system.

In one embodiment, illumination characterization device further comprises a plurality of indicators coupled to the processor, wherein each indicator in associated with one of the plurality of light sensors, and wherein the instructions further cause the processor to be configured for: receiving one or more target settings; generating a comparison between the one or more target setting with the one or more light sensors for one or more of the plurality of light sensors; and operating the indicators in accordance with the comparisons.

In one embodiment, the plurality of indicators comprise a plurality of LED ring lights disposed around the plurality of light sensors.

In one embodiment, illumination characterization device further comprises an LED array configured to illuminate in sequence.

Another embodiment of the present disclosure is directed toward a method comprising: receiving, in an illumination characterization device, a set of target light measurements; controlling a plurality of light sensor coupled to the illumination characterization device to capture a plurality of light measurements; and analyzing, in the illumination characterization device, the plurality of light measurements to generate a plurality of light measurement results.

In one embodiment, the plurality of light measurements comprises calculating a uniformity of the plurality of light measurements.

In one embodiment, the plurality of light measurements comprises calculating a color temperature for the plurality of light measurements.

In one embodiment the method further comprises displaying the plurality of light measurement results on a display device of the illumination characterization device.

The following detailed description and accompanying drawings provide a better understanding of the nature and advantages of the present invention.

BRIEF DESCRIPTION OF THE DRAWINGS

FIG. 5B depicts a detail view of a retractable chart registration clip in an open position according to an embodiment of the present disclosure.

DETAILED DESCRIPTION

Described herein are techniques for systems, methods, and devices for characterizing lighting and imaging systems.

The apparatuses, methods, and techniques described below may be fully or partially implemented as computer programs (software) executing on one or more computing devices. Accordingly, computer programs used in various implementations of the present disclosure may be embodied as executable code stored on non-transitory computer readable media. The computer programs may include instructions for performing the processes described herein.

When capturing images of test/calibration scenes, such as test charts, it is important that the test charts be evenly illuminated. Uneven illumination can introduce errors in measurements taken from and calibrations based on the images of the test charts. It is also important to measure the actual illumination levels and record measurements in a manner that can be associated with the images of the test charts.

In traditional test systems, a technician can use a handheld light meter to measure the incident light in several areas of the chart. The use of handheld light meters is deficient for several reasons. Firstly, the light sensor of the handheld light meter must be held against the chart. This is usually done by hand, however, the presences of the handheld light meter and user often can cast a shadow otherwise change the illumination of the test chart, thus distorting the resulting light readings and any results derived therefrom.

In addition to the potential undesirable impact on the illumination of the test chart and the resulting measurements or calibration, the use of handheld light sensors may also make adjusting the lights difficult and time consuming. If the light meter is temporarily held in place by some apparatus, such as a stand, it must be removed during actual image capture. Both manual light measurement techniques can slow the measurement and characterization processes, thus causing undesirable delays.

Characterization System and Device

Figure 1A:
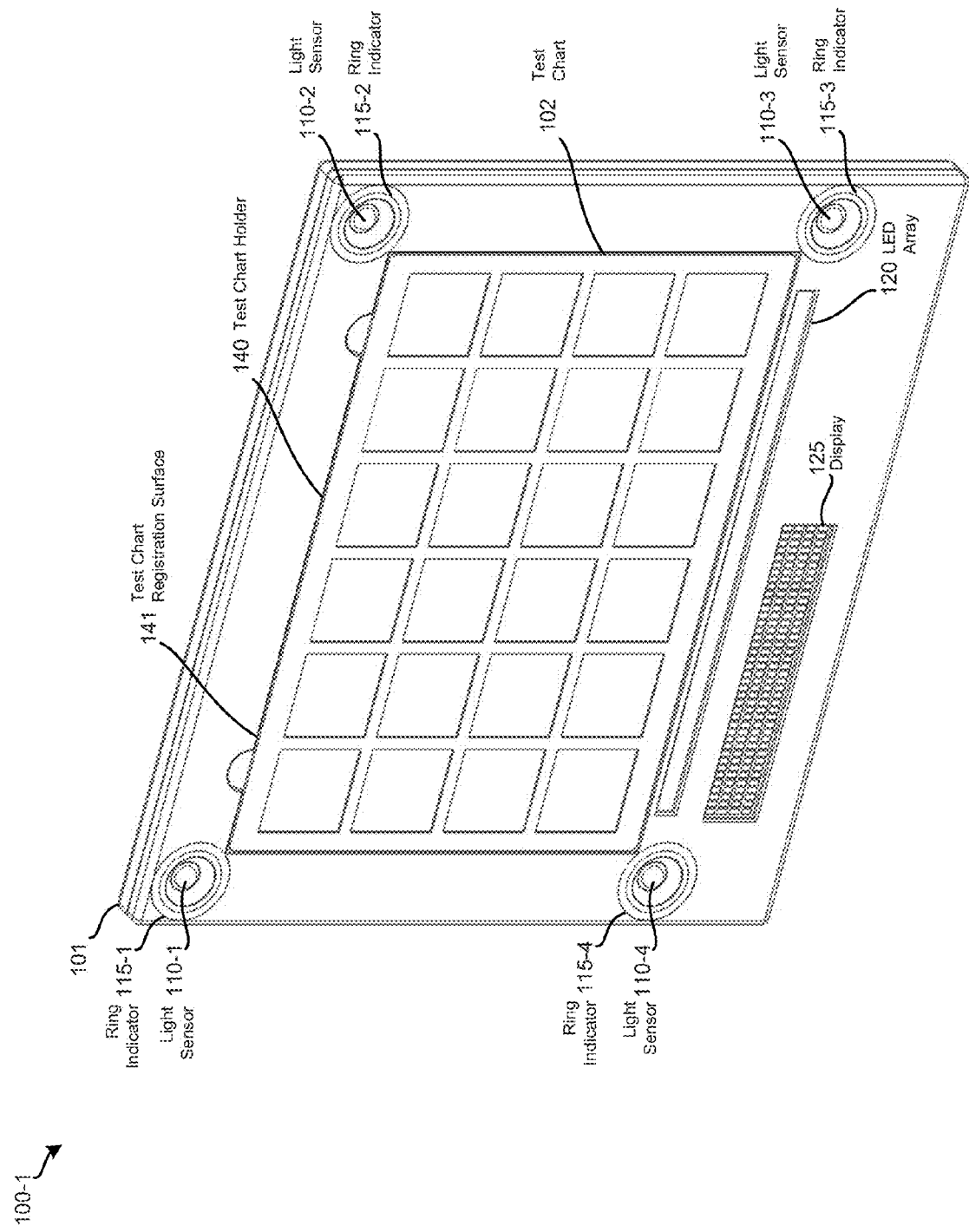
FIG. 1A depicts the front of a characterization device with integrated timing and illumination measurement components according to an embodiment of the present disclosure.

One embodiment of the present disclosure includes a characterization device that can include a chart holder, one or more light sensors, and one or more displays indicating various conditions or measurements (e.g., light level, uniformity, etc.). FIG. 1A illustrates an example imaging and lighting system characterization device 101 according to various embodiments. For the sake of clarity and brevity, the imaging and lighting system characterization device 101 is often referred to herein as characterization device 101. The characterization device 101 may include a main body module comprising multiple light sensors 110 disposed around a test chart holder 140. In the particular example shown, the four light sensors 110 are disposed at the four corners of the test chart holder 140 on the front 100-1 of the characterization device 101. A test chart 102 can be inserted into the test chart holder 140 and aligned using the cut-out and registration surfaces 141. Each light sensor 110 can measure the incident at its corresponding location. Measurement of the incident light can include light level (i.e., illuminance) and/or light color or temperature.

When the light sensors 110 are active, indications of the measurement of the incident light can be displayed in one or more displays on the characterization device 101. For example, the detected light levels or color information can be displayed on the display 125 (LCD or LED) and/or be encoded in the signals displayed in the ring indicators 115. The information shown by the ring indicators 115 may correspond to measurements determined by a corresponding light sensor 110. In the example shown in the FIG. 1A, the ring indicators 115 may include information about the measurements made by the light sensor 110 around which they are disposed.

Operation of the characterization device 101 can be triggered by the capture of an image (e.g., triggered by the shutter release command of a camera system). Various components of the characterization device 101 can be captured in the test images, illumination information is included in the captured image of the test scene, thus allowing any user viewing or using the image to easily access the information about the lighting. By continuously measuring the light level at multiple locations around the test chart the user is free to adjust the brightness of lights illuminating the scene to achieve the desired illumination level and uniformity.

Embodiments of the present disclosure allow a single user to measure and monitor the illumination level and uniformity continuously without an assistant or repositioning a single light meter to increase the speed with which images of the requisite test charts can be captured.

The characterization system and device 101 can also be connected to automated or controllable lights, either directly or through a computing device or network, over USB, serial, wireless, or other interfaces. The data from the characterization device 101 light sensors 110 can be used to automatically adjust the lights to achieve the desired illumination level and uniformity. This improves the speed and accuracy of the lighting set-up and testing processes.

Figure 1B:
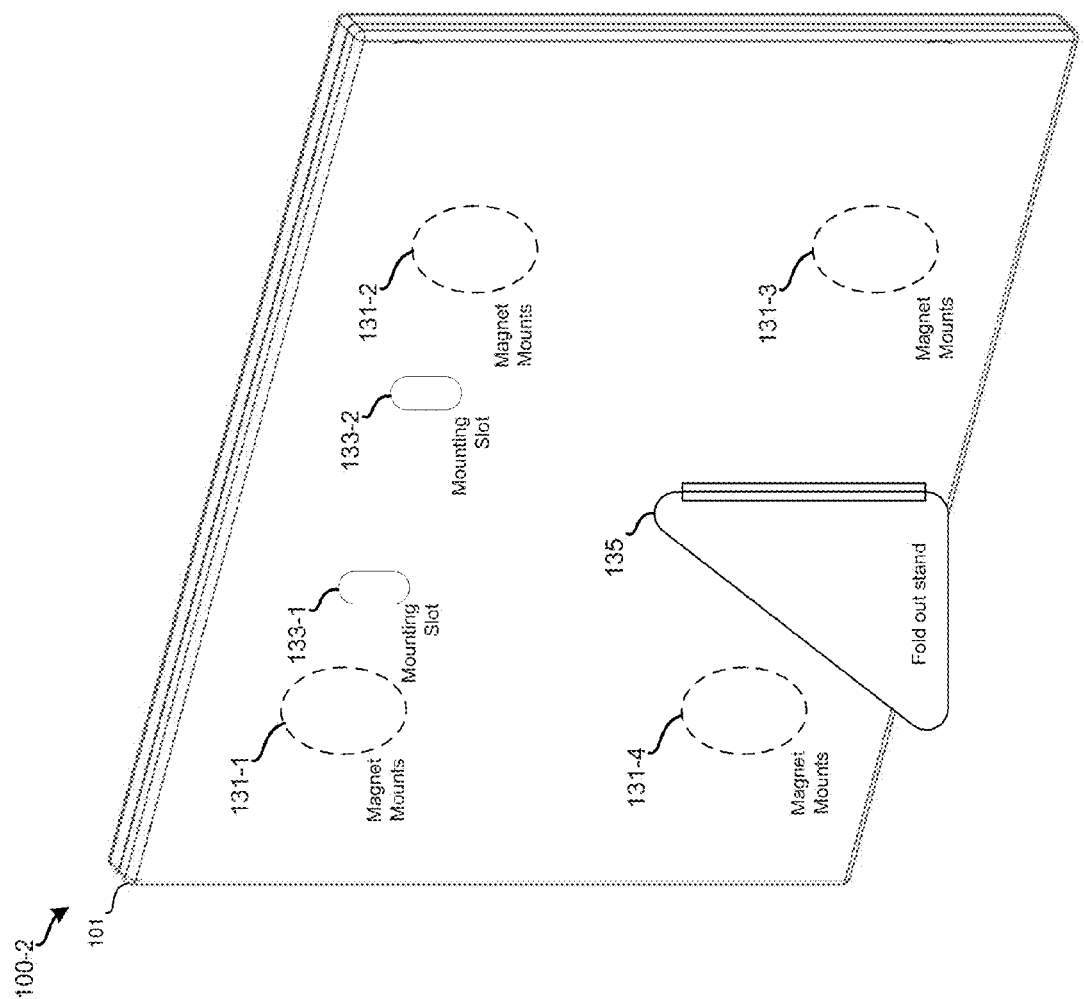
FIG. 1B depicts the back of a characterization device with integrated positioning and mounting components according to an embodiment of the present disclosure.

FIG. 1B illustrates various mechanisms for positioning the characterization device 101 relative to a particular lighting system, according to various embodiments of the present disclosure. As shown, the back of the characterization device 101 may include magnets to hold the characterization device 101 to a magnetic surface. The characterization device 101, while not specifically illustrated in FIG. 1B, may include ¼"-20 threaded holes on the bottom (left, center, right) for tripod mounting. In some embodiments, the characterization device 101 may include a fold-out stand 135 on back 100-2 to allow tabletop use. In other embodiments, the characterization device 101 may include holes of various sizes and shapes for hanging the chart by a hook or string. Using one or more of the positioning mechanisms, the characterization device 101 can be positioned anywhere within a particular mission field or test image set up.

Moving back to the front 100-1 of the characterization device 100 illustrated in FIG. 1A, the light sensors 110 may include calibrated light sensors. In one embodiment of the present disclosure, the light sensors 110 measure the illuminance in lux. In some embodiments, the range of the light sensors 110 can range from 0 lux to 300K lux (i.e., 6 powers of 10), and can give 0.01 lux or smaller resolution at lower light levels.

The test chart holder 140 may include a recessed area for accurately positioning standard-sized test charts (e.g., Macbeth™ charts that are 290 mm×204 mm).

The ring indicators 115 may include red green and blue (RGB) LEDs to indicate whether the illumination at each corner is above, below, or within the target illumination range. In some embodiments, the color of the ring indicator 115 can signal various conditions in the illumination field or other information. For example, if the light incident on a particular light sensor 110 is to dark, the ring indicators 115 can be configured to illuminate red or flash with a particular pattern. If the light incident particular light sensor 110 is the correct level, then the ring indicators 115 can be configured to illuminate green. In related embodiments, the lights incident on a particular light sensor 110 is too bright, then the ring indicators 115 can be configured to illuminate in a particular color or with a particular pattern. The color/flash schemes for ring indicators 115 depicted in Table 1 are only a few examples of possible indications of the light incident on any of the light sensors being too dark, correct, or too bright. The ring indicators 115 can also indicate system status information such as battery level, or wireless network connection status.

TABLE 1

Ring indicator color/flash schemes

|  | Scheme 1 | Scheme 2 | Scheme 3 | Scheme 4 |
|---|---|---|---|---|
| Too dark | Off | Red | Red | Red Slow Flash |
| Correct | Green | Green | Green | Green |
| Too Bright | Red | Yellow | Blue | Red Fast Flash |

In various embodiments of the present disclosure, the ring indicators 115 may include LED or other light sources disposed directly next to light sensor 110. While the example ring indicators 115 are circular and disposed around the light sensor 110, indicators with different shapes, configurations, and relative positions to the light sensors 110 are possible. In one embodiment, the ring indicators 115 can be embodied as a cluster of multicolor LEDs disposed away from each one of light sensors 110. In such embodiments, the configuration of the cluster of LEDs can correspond to the placement of light sensors 110 on the front 100-1 of the characterization device 101. For example, the cluster of LEDs may be in a square formation near the other displays 120 or 125. The indications shown by each one of the LEDs in a particular location in the cluster would directly correspond to the location of the corresponding light sensor 115. For example, the LED in the top rightmost corner of the cluster could corresponding to the light sensor 115-2 in the top rightmost corner of the characterization device 101. The LED in the bottom left most corner of the cluster may correspond to information or measurements made by the light sensor 115-4. In any such embodiments, the lights from the ring indicator 115 can be shielded from the light sensors 110 to prevent light from the indicator being detected and thereby interfering with the measurement of the lighting system.

The characterization device 101 may include controls and circuits that allow a user to set a target light level (e.g., 10 lux, 1000 lux, etc.), and set the required light level tolerance (e.g., 1%, 5%, 10%, no tolerance). The tolerances can be absolute or relative. If no target light level is set, then the characterization device 101 can default to a relative tolerance. Specifically, the light will measurements amongst the light sensors 110 will need to be kept within the set percentage tolerance. Alternatively, if the target light level is set, then the tolerance can be maintained is absolute to that target light level.

In other embodiments, the characterization device 101 can display the average, minimum, and maximum light levels measured by one or more of the light sensors 110. In such embodiments, the incident light levels can be displayed on one or more of the displays 120 or 125. In addition, the ring indicators 115 may also include alphanumeric displays that can directly show the light level measurements of a particular light sensor 110 in the corresponding ring indicator 115. In such embodiments, the light level measurements made by a particular light sensor 110 can be displayed near the light sensor 110.

In some embodiments, the display 125 may include a backlit LCD and/or touch screen. In such embodiments, the display 125 can automatically adjust its brightness and contrast to match ambient light levels. Such embodiments ensure that the display 125 is readable without creating light pollution that can interfere with the measurement of the lighting system of interest. In other embodiments, the characterization device 101 may also include buttons as part of user interface. These buttons can also be backlit.

In some embodiments, the characterization device 101 may include a LED array 120. The LED array 120 can include visual indications of frame rate and camera activity. For example, the LED array 120 may include a line of LEDs that light in sequence at an exact rate. Such timed illumination of LEDs can be used for determining exposure times and for measuring or characterizing the frame-to-frame jitter in video. In one embodiment, the array 125 may include 100 LEDs disposed across 10 inches of the front 100-1 of the characterization device 101 with a 0.1" spacing. In some embodiments, the LED array 125 may include a bar graph LED array. For embodiments in which a test chart is used that fills one third of a 640 (VGA) line, each LED occupies approximately 2 pixels.

In one embodiment, some of the LEDs in the LED array 125 can be used to demark a particular scale of time. For example, each fifth or tenth LED can be a marked or made special to make counting easier. Each one of the special LEDs can be made to be a different color or be made to illuminate brighter or dimmer than the other LEDs. In some embodiments, the interval of the special LEDs is programmable and the overall brightness of all the LEDs in the LED array 125 can be automatically adjusted to prevent light pollution.

The characterization device 101 may also include an audio-LED output for video sync testing. In such embodiments, the LED array 125 can flash in sync with the speaker tick or tone. Such features are advantageously useful in tests that characterize the audio-video synchronization of a video feed.

The display 125 may be operated in various modes. In such modes, combinations of information that can be displayed on the display 125. For example, the display 125 can show the average light level (lux) and the uniformity of illumination (% flatness). The display 125 may also include an alphanumeric indication of the light measure readings in each one of the light sensors 115. In addition, the display 125 may also include alphanumeric indications of the average light level and color temperature of the illumination system being tested. Using either the LED array 120 or the display 125, the characterization device 101 can also include information about the light level and/or exposure time of a particular image of the testing. Any of the indications of measurements made by the light sensors 110 or information calculated based on the measurements made by the light sensors 110 can be depicted as alphanumeric text and/or visual representations (e.g., bar graphs).

Figure 2A:
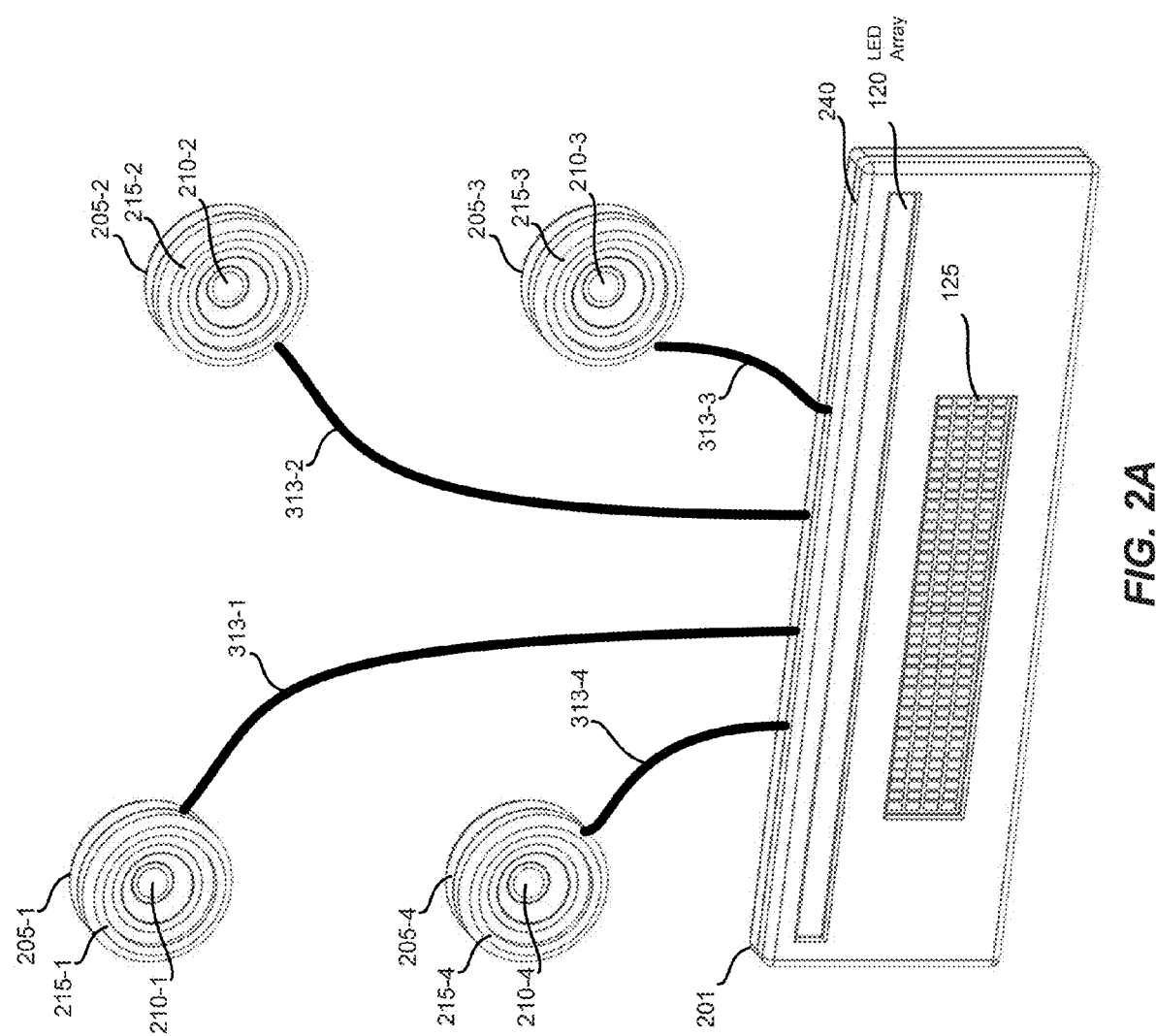
FIG. 2A depicts a characterization device with integrated timing and tethered illumination measurement components according to an embodiment of the present disclosure.

FIG. 2A depicts another characterization device 201, according to an embodiment of the present disclosure. Characterization device 201 can include the display 125 and the LED array 120 as described in reference to FIG. 1A. However the light sensors are not rigidly disposed relative to the other components of the characterization device or one another. The example embodiment shown in FIG. 2A includes multiple light sensor modules 205 that can be tethered to a main body of the characterization device 201 by corresponding wired connections 313 (e.g., serial or USB cables). While only four light sensor modules 205 are shown in FIG. 2A, one of ordinary skill in the art will recognize that more or fewer light sensor modules 205 may be tethered to the characterization device 201. In one embodiment, the main body of the characterization device 201 may include a slot or groove 240 to hold the edge of a test chart in place.

The light sensor modules 205 may include a light sensor 210 and a ring indicator 215. The light sensors 210 and the ring indicators 215 may include functionality similar to those described in reference to the light sensors 110 and ring indicators 115 depicted in FIG. 1A. In addition, the light sensor modules 205 may also include various mounting mechanisms for positioning them within a particular scene. For example, each light sensor module 205 may include a magnet, a clip, a tripod mount, threaded holes, adhesive, books, stands, etc. for disposing a light sensor in a desired position. Measurements made by the light sensor 210 each one light sensor modules 205 can be received by the main body of the characterization device 201 through the connecting cables are wires 313. In addition, the main body of the characterization device 201 can send signals to the ring indicators 215 to display information about the measurements made by the light sensors 210 to the corresponding light sensor modules 205. For example, the main body of the characterization device 201 can send signals to the light sensor modules 205 to control the ring indicators 215.

Figure 2B:
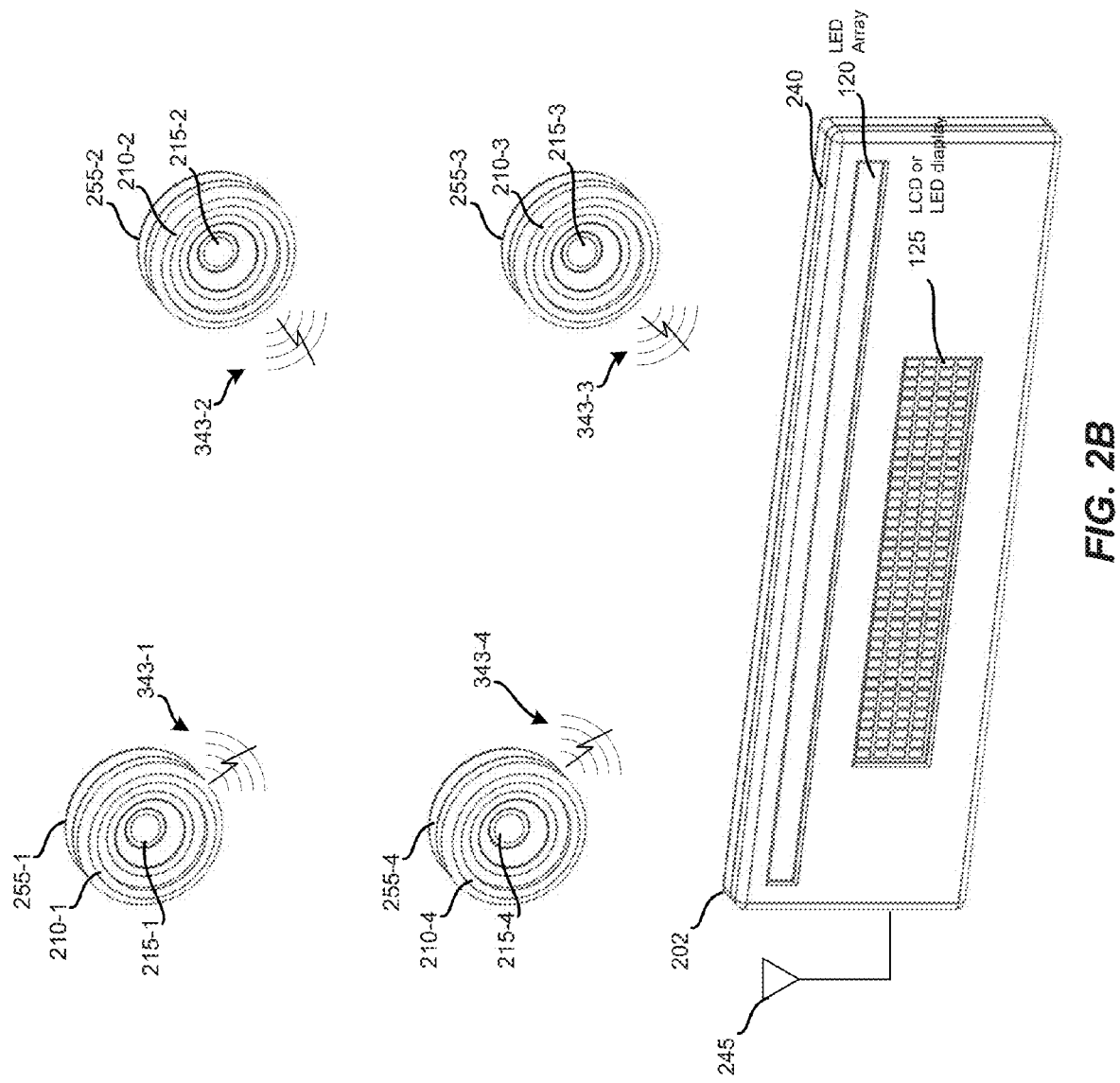
FIG. 2B depicts a characterization device with integrated timing and remote illumination measurement components according to an embodiment of the present disclosure.

FIG. 2B illustrates another example embodiment of the present disclosure. In the example depicted in FIG. 2B, the main body of the characterization device 202 may be wirelessly connected to multiple wireless communication enabled light sensor modules 255 using one or more wireless communication media or protocols 343. In one embodiment, the light sensor modules 255 may include a wireless communication interface. For example, each one of the wireless light sensor modules 255 can use its corresponding wireless communication interface (e.g., a wireless network interface card/transceiver) to establish one-way or two-way communication over Bluetooth, Wi-Fi, or other wireless communication or networking protocols with the main body of the characterization device 202. Accordingly, in such embodiments the characterization device 202 may include an antenna 245 for receiving the signals from the wireless light sensor modules 255 directly or through a network communication protocol. As with the tethered light sensor modules 250, the wireless light sensor modules 255 may be positioned independently of one another within a particular scene using various types of mounting mechanisms.

In various embodiments, such as those described in reference to FIGS. 2A and 2B, the light sensor modules may be coupled to the main body module 201/202 in a removable manner. For example, the main body module 201/202 and the light sensor modules 250/255 may include corresponding docking elements to attached the light sensor modules to the main body. In such embodiments, the docking elements may include magnets, clips, screws, clasps, and the like. Accordingly, the light sensor modules 250 and 255 can be used while attached to the main body modules 201/202 or with the light sensor modules 250 and 255 can be deployed in arbitrary locations relative to one another when detached from the main body modules 201/202.

Figure 2C:
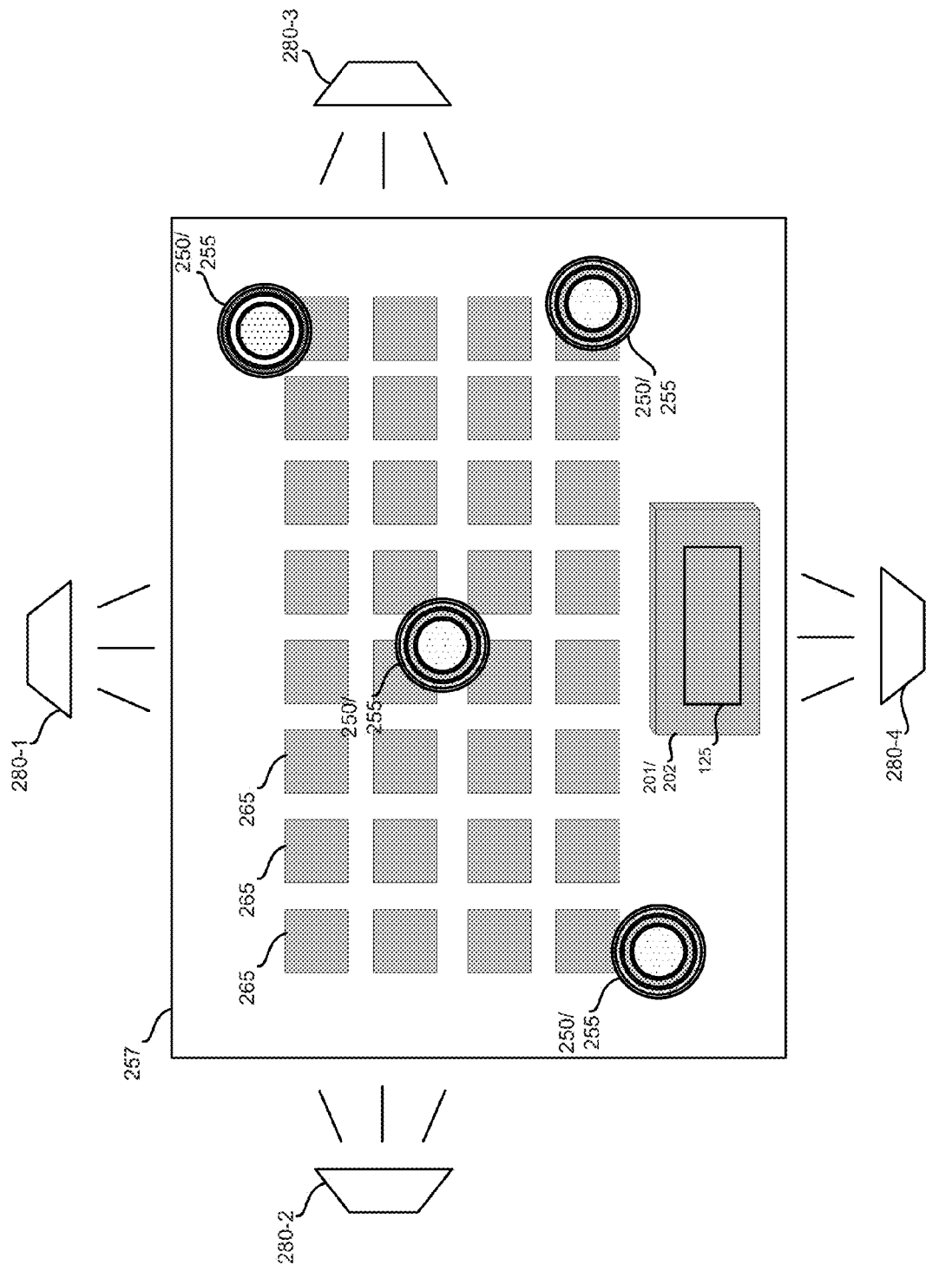
FIG. 2C depicts a characterization setup with a characterization device with integrated timing remote illumination measurement components according to an embodiment of the present disclosure.

FIG. 2C illustrates a particular test scene 257 that can be measured by various embodiments of the present disclosure. The test scene 257 include a number of test targets 265 illuminated by light sources 280 of a particular lighting system from various directions. To measure the light levels at various points within the illumination field provided by the light sources 280, a user can place multiple light sensor modules 250/255 at various locations in the test scene 257. In the particular example shown, light sensor modules 250/255 are located at the bottom two corners, the center, and the top rightmost corner of the test scene 257. In addition, the characterization device 201/202 has been disposed at the bottom of the test targets 265. Any information displayed in the LED array 120 (not shown) or the display 125, can also be captured in an image of the test scene 257.

Figure 2D:
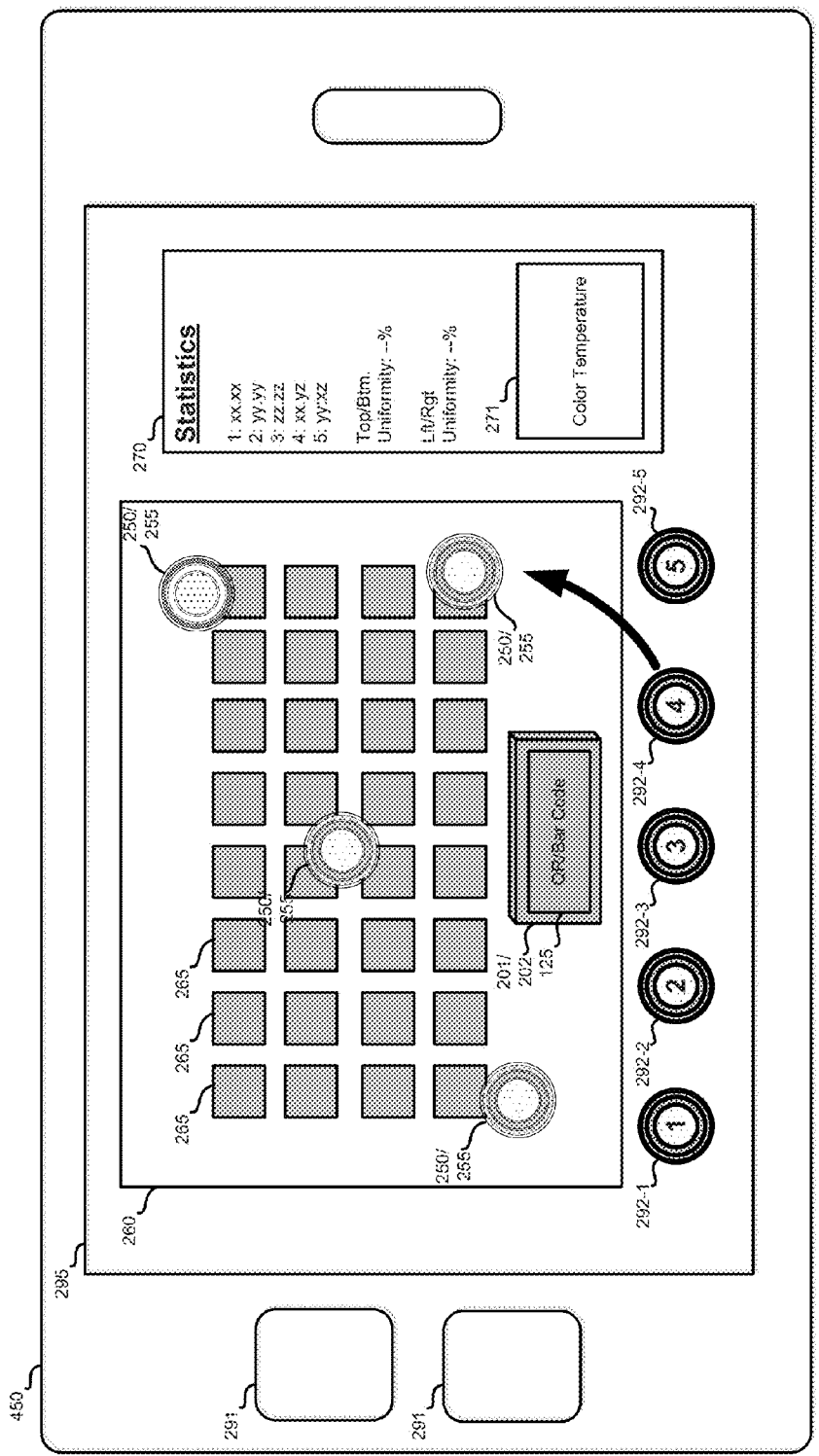
FIG. 2D depicts a user interface with an image of a characterization setup according to an embodiment of the present disclosure.
Figure 2E:
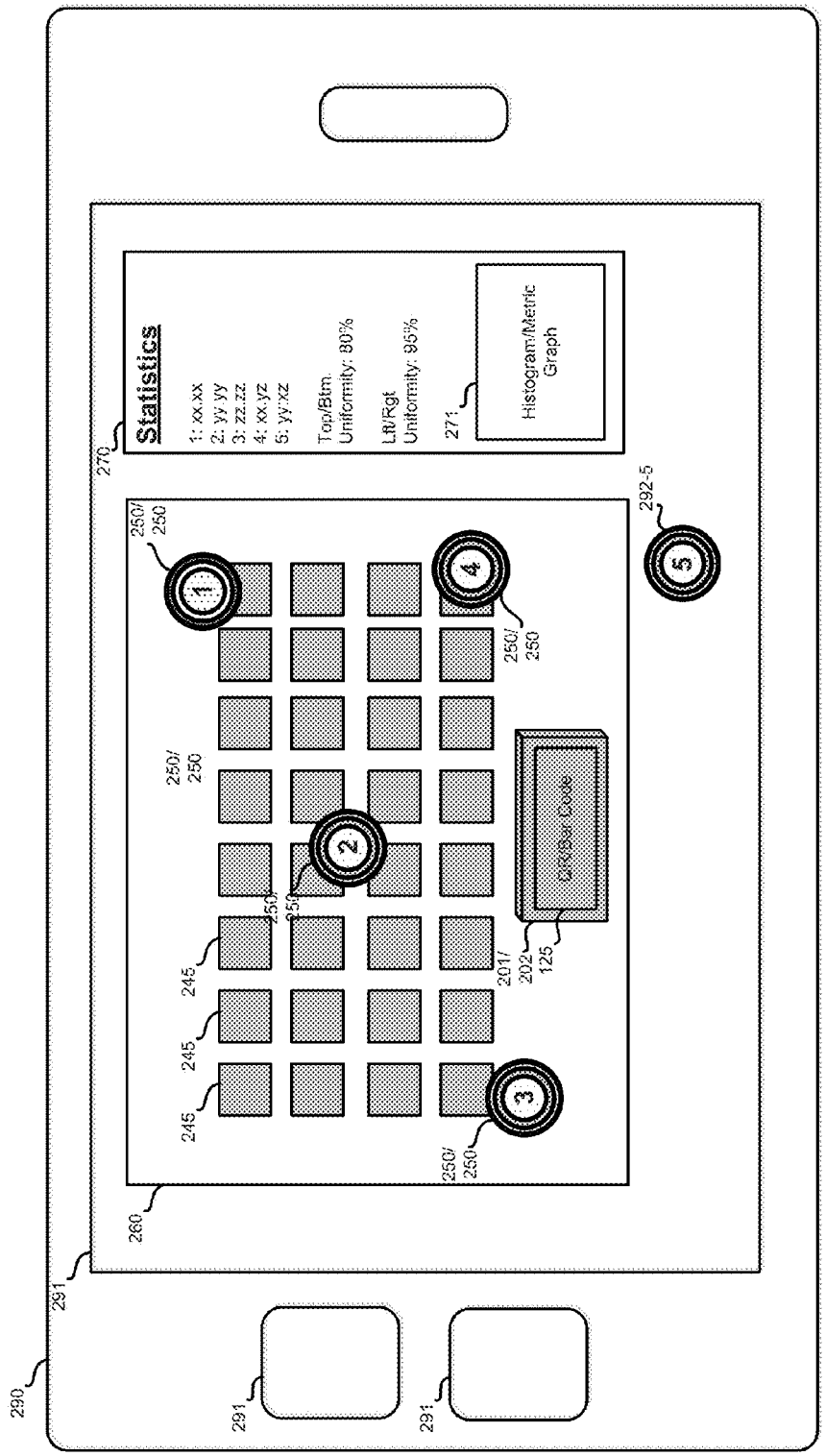
FIG. 2E depicts a user interface with an image of a characterization setup with light sensor icons placed in the image, according to an embodiment of the present disclosure.

FIG. 2D depicts the captured image 260 of a particular test scene displayed on a display device 295 of a computing device 450 (e.g. a tablet computer or smart phone). The display device 295 may include a touchscreen, an LCD monitor, an LED monitor, and the like. The computing device 450 may include controls 291 for initiating an application that triggers the image capture routine that controls an imaging system that results in the captured image 260.

The captured image 260 may include a number of test targets 265 (e.g., color chips), a number of light sensor modules 250/255, and the main body of the characterization device 201/202. However, because the light sensor modules 250/255 are not rigidly disposed relative to one another, it is necessary establish their relative positions to calculate overall light characteristics, such as absolute brightness, uniformity, and color temperature. Using the relative placement of the light sensor modules 250/255 and/or their coordinates within the captured image, the light sensor readings from each of the light sensor modules 250/255 can be attributed to a particular location within the test scene. While each light sensor reading may be associated with an identifier associated with the light sensor module 250/255 that took the measurements, it may be difficult for the computing device to determine where each light sensor module is within a particular scene.

To give the user and/or application information about the location of each one of the light sensors 250/255 within the captured image 260, the computing device 450 may render controls 292. In response to user input indicating dragging-and-dropping, the controls 292 that indicate the identification of a particular light sensor module 250/255 can be dropped onto the image of the corresponding light sensor module in the captured image. For example, the control or icon 292-1 can be dragged and dropped onto the image of the light sensor module 250/255 designated as number one. Similarly, the remaining controls or icons 292-2 through 292-5 can be dragged and dropped onto the corresponding images of the other light sensor modules 250/255. This information will then allow the application or the user to associate light sensor readings received from each one of light sensor modules 250-255 to a particular location within the image 260. FIG. 2D depicts the user interface rendered on computing device 450 after the controls 292 have been dragged and dropped into their particular locations within the scene to designate or associate a particular light sensor module identifier (e.g. 1, 2, 3, and 4) with a particular location within the captured image 260. In the specific example, only four light sensor modules 250/255 were captured in the image 260. Accordingly, control 292-5 is not associated with a particular location in the captured image 260.

In other embodiments, the computing device 450 that renders the user interface on the display device 295 may analyze the captured image 260 using pattern or text recognition to identify shapes or markings on the light sensor modules 250/255 to determine the corresponding locations of those modules within the captured image 260. For example, one of the light sensor modules 250/255 may be labeled with a machine readable code or text (e.g., barcodes, QR codes, alphanumeric text, etc.) that can be recognized by the computing device 450. Alternatively, the light sensor modules 250/255 may have different shapes (e.g., circles, cross-hair shapes, checkerboards, squares, triangles, hexagons, etc.) that would differentiate one light sensor module 250/255 from another.

Once the location of each one of the light sensor modules 250/255 is known, the application may determine and display various statistics and numerics 270. Based on the light sensor readings and the known locations of each one of light sensor modules 250/255, the computing device 450 can calculate the top to bottom and the left to right uniformity of the illumination of the captured image. In embodiments in which light sensors 110 in the light sensor modules 250/255 can determine color characteristics of the illumination, the computing device 450 may analyze the captured image 260 to calculate color temperature. The information regarding the color temperature 271 can be displayed as alphanumeric text or as a graphic.

In one embodiment, the information regarding the color temperature 271 may also include a correction information. The color correction information may include an indication as to how close the output of the source 280 of a particular lighting system is to the target color temperature or color coordinates. For example, the correction information may indicate measured color temperature of the lighting system in degree kelvin, the target color temperature in degree kelvin, and/or the difference in degree kelvin between the measured color temperature and target color temperature. In on embodiment, the correction information may include a correction factor. In such embodiments, the color correction factor may be given in units of mireds (e.g., $M=10^6/T$, wherein T is the color temperature in degrees kelvin). For example to shift the color temperature of a lighting system from 5700K (i.e., natural light) to 3200K (i.e., tungsten light):

$$M = \frac{10^6}{5700} - \frac{10^6}{3200} \approx -137 \text{ MK}^{-1}$$

Accordingly, the correction factor can also include a recommended color filter or gels to add to the light sources to achieve the correction factor that will correct the color temperature of the lighting system. For example, for the natural day light to tungsten shift described above, $-137$ MK$^{-1}$ corresponding to a color temperature blue (CTB) filter.

In one embodiment, the color correction information, as well as any other information that can be shown in the user interface described herein, can be displayed on the display 125 of the characterization device.

In one embodiment, the characterization device 101, or an associated computing device, can measure and calculate the color temperature of the lighting system, compare the determine color temperature, and calculate a color correction factor. Using the color correction factor, the characterization device 101 or its associated computing device can determine a recommended filter or gel to add to one or more of the light sources to correct the overall color temperature or the color temperature uniformity. To determine the recommended filter or gel, the characterization device 101 or its associated computing device can access a color correction table that associates various identifier of specific filters and gels with a color correction factor.

Figure 3:
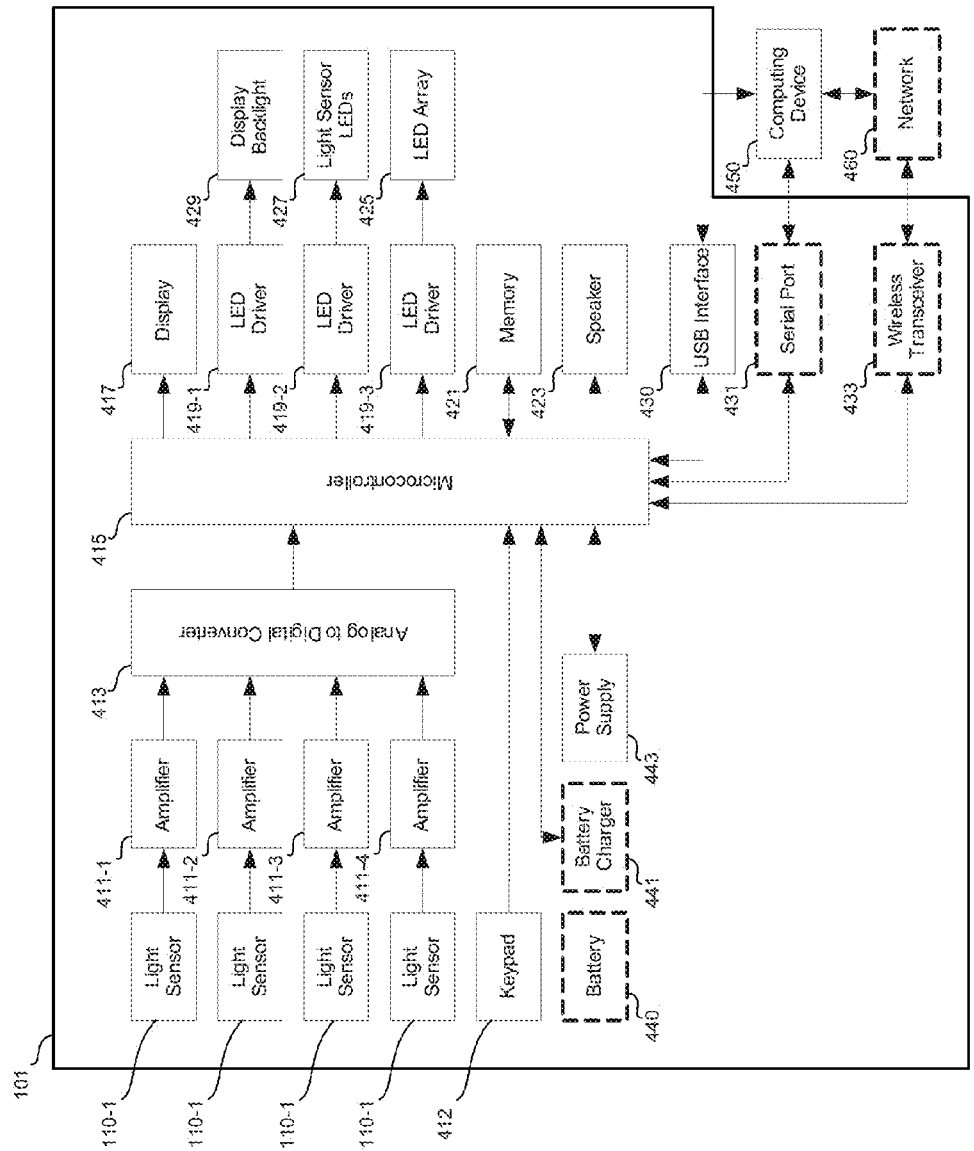
FIG. 3 depicts a schematic diagram of a characterization device according embodiments of the present disclosure

FIG. 3 shows a block diagram of imaging and lighting system characterization device 101 according to various embodiments. While specific components are cited as performing specific functions of the characterization device 101 in FIG. 3, one of ordinary skill in the art will recognize that other types of components can be used to implement the functionality described herein without departing from the spirit or scope of the disclosure. For example, the light sensors 110 may include any type of light sensitive device. In one embodiment, the light sensors 110 may be photodiodes that output a voltage or current proportional to the incident light level.

The a light sensor 110 will typically have an inherent spectral response. That is, the light sensor 110 may be more responsive to certain wavelengths of light than to other wavelengths of light. For example, most silicon based light sensors are much more responsive to wavelengths in the red to infrared portion of the spectrum than they are to blue portions of the spectrum. However, the inherent spectral response of a given light sensor 110 may not be ideal for a given lighting systems or comparable to the spectral response a particular imaging system.

To shape or customize the color or spectral response of a particular light sensor 110, absorptive or interference filters may be added to the light sensors 110 to adjust the independent spectral response of each light sensor 110. For example, some or all of the light sensors 110 may include one or more color filters to adjust their inherent spectral response to approximate the spectral sensitivity of the human eye, i.e. photopic response, or any other spectral response, e.g. infrared or ultraviolet skewed responses to mimic the color responses of a particular other light sensitive device, e.g., a CCD or CMOS imaging chip. In other embodiments, each light sensors 110 may be a composite light sensor that includes multiple component light sensors in a given area. For example, the light sensor can include an array of component light sensors. In related embodiments, each one of the component light sensors in a given array may include a specific light filter, e.g., a mosaic of light filters over an array of light sensors. Such composite light sensors can be used in various embodiments described herein that include color characterization of light source and systems.

In some embodiments, the light sensitive sensors 110 can be disposed in fixed locations relative to the other components of the characterization device 101. In other embodiments, the location of the light sensor 110 can be moved relative to one another and to the over components of the characterization device 101. In such embodiments, the light sensors can be placed in various areas of interest in a illumination field to capture lighting measurements in those specific areas of the illumination field. The detected lighting measurements can be compared or otherwise process to characterize the illumination system. For example, the light sensor 110 can be placed across a particular scene to determine uniformity and other illumination field characteristics.

In one embodiment, each light sensor can be coupled to an amplifier 411. The amplifiers 411 can amplify the signals from the corresponding light sensor 110. In one example, the amplifiers 411 can convert the signal from a photodiode type light sensor 110 from a current to a voltage and magnify the voltage to improve dynamic range, detectability, or sensitivity. The amplifiers may feature adjustable or programmable gain so that the signal-to-noise ratio and output level of the light sensors 411 can be matched to the input voltage range of the analog to digital converter (ADC) 413. Such adjustable or programmable settings can be made using analog or digital signals.

The ADC 413 converts the signals from the amplifiers 411 or the light sensor 110 into a digital value. The ADC can be configured to have sufficient dynamic range to accommodate the brightest and dimmest light levels while maintaining an acceptable noise floor.

In one embodiment, the characterization system 110 may include a single ADC 413 with an input multiplexer or multiple ADCs. In embodiments with a single ADC 413, the output of each light sensor 110 may be converted sequentially. In embodiments with multiple ADCs, the signal levels from each light sensor 110 can be converted simultaneously, reducing conversion time and improving the response time of the characterization system 110.

In one embodiment, the microcontroller unit 415 (MCU) may manage and coordinate the operation of all the components of the characterization system 110. The MCU may coordinate the ADC conversion timing, correct errors in the measurements from the light sensors 110, and convert the readings from the light sensors 110 to photopic units, such as lux, or color units such as CIEXYZ coordinates or correlated color temperature.

In some embodiments, the characterization system 110 can receive user input for system settings and operational control. The user input can be received through some or all of the keypad 412, adjustment dials, switches, or other controls. The characterization device 101 can output various information through one or more of the display device 417, display backlight 429, light sensor LEDs 427, disposed adjacent to a corresponding light sensor 110, the LED array 425, the speaker 423, the USB interface 430, the serial port 431, or the wireless transceiver 433.

In one embodiment, the display 417 can display alphanumeric data and graphics. Depending on the operating mode of the characterization device 101, the display may show numeric light levels incident on one or more light sensors 110, graphic representations of the light levels (e.g., bar graphs or time graphs), and system status (e.g., power and battery levels, operating modes, and settings).

In some embodiments, the display 417 may include an backlight 429, such as an LED backlight, to improve display visibility in low light conditions. In such embodiments, the MCU 415 controls the LED driver circuit 419-1. The LED driver circuit 419-1 controls the brightness of the display backlight 429. The backlight brightness can be either manually controlled or automatically adjusted by the MCU 415, depending on the ambient light level determined using the light sensors 110 (e.g., the backlight may be turned off in very bright light, made brighter in moderate light levels, or dimmed in very low light levels).

During very low ambient light levels, the display backlight 429 may appear so bright that it causes a camera under test to alter its exposure or color performance. The display backlight 429 may also be bright enough to increase the ambient light level, affecting the accuracy of measurements. Automatically reducing the display backlight 429 brightness in low light prevents both of these problems. Accordingly, in some embodiments, the level of the display backlight 429 is set automatically in response to the lighting system setting and/or the imaging system settings to provide an appropriate light level that does not skew the test results, (i.e. the backlight can be maintained at level so as to not saturate or overexpose an imaging system or to impact the light levels in the test studio).

One use of the characterization system 110 may be to achieve, among other conditions, a particular average light level, or uniformity of lighting between the light sensors 110. Thus, each light sensor 110 may receive either too much, too little, or an acceptable amount of light. To make it easier for the user to judge or adjust light levels the characterization device 101 may include includes lights, such as light sensor LEDs 427, near each light sensor 110. The light sensor LEDs 427 may illuminate, change color, flash in various patterns, or otherwise change appearance depending on the incident light level on each associated light sensor 110. In one embodiment, one of the light sensor LEDs 427 may illuminate red when the incident light on a corresponding light sensor 110 is too low, green when correct, and yellow when too bright. In other embodiments, the light sensor LEDs 427 or other display at or near each light sensor 110 can read out the actual light measurements detected by the a corresponding light sensor 110. In some embodiments, the display 417 can blink, illuminate in a color, include alphanumeric text with a static or rolling readout of one or more levels measured by the light sensor 110.

Like the display backlight 429, the light sensor LEDs 427 may be automatically adjusted with the ambient light level.

As used herein the terms "measurement" and "light measurement" can be used interchangeably to refer to any measurement of a particular lighting situation or illumination fields. Unless indicated otherwise by context, a light measurement can include intensity measurement, illuminance measurements, color measurements, color temperature measurements, luminance measurements, and the like.

The characterization device 101 may include an LED array 425. In some embodiments, the LED array can include bar-graph-style LEDs, arranged in one or more horizontal linear rows. The main function of the LED array 425 is to measure exposure time and have it recorded in a still or moving test image.

In an exposure-time mode, the LED array 425 may be operated as follows. The MCU 415 can control each of the LEDs to cycle on and off with a predetermined duration, one at a time, in sequence. Once the last LED cycles on and off, the sequence repeats indefinitely. To measure exposure time, the user sets the on-time to a small fraction of the anticipated exposure time and then captures an image of the LED array. Depending on the exposure time, one or more LEDs will be lit in the image. The exposure time of the image can be estimated by counting the number of lit LEDs and multiplying by the on-time. The on-time can be displayed on another display, such as an LCD display elsewhere in the image.

In some embodiments, the brightness of the LEDs in the LED array 425 during their individual on-time can be varied to indicate a scale in the running LED array 425. For example, every fifth LED can be made to emphasized (e.g., shine brighter or dimmer than the four intermediate LEDs). Thus, depending on the on-time setting (e.g., 2 ms) the number of LEDs captured while in the on-state can be easily estimated by comparing the number of emphasized LEDs in the LED array 425. The number of lit LEDs can be estimated by first counting the number of emphasized LEDs, and then counting the remaining LEDs on either end. For example, if every fifth LED is set to shine brighter and thirty-seven LEDs are lit, then there will be seven brighter, or emphasized, LEDs lit. This indicates that seven groups of five LEDs are lit. The user need only count the two remaining LEDs on the ends of the lit section of LEDs to arrive at the total of thirty-seven LEDs. Without the emphasized LEDs, the user would have to manually count every lit LED individually, taking considerably longer time and being more prone to errors.

The LED array 425 may also be used to measure frame-to-frame video timing variation. By operating the LEDs in the LED array 425 at a slower rate than for still images, different LEDs will be visible in sequential video frames. To measure frame-to-frame jitter, an imager system can capture a video of the LED array 425. The number of LEDs visible in each frame can then be determined. If all the frames have the same or nearly the same number of LEDs visible, the frame rates is constant. Any variation in the number of visible LEDs, or any missing LEDs indicates image capture problems. Again, to aid in the easy discernment of the number of LED visible in each frame, the brightness of the LEDs in the LED array 425 can be controlled individually to automatically scale the LED array 425. For example, every Nth LED in the LED array 425 can be made brighter/dimmer to designate a particular time interval between each brighter/dimmer LED based on the particular on-time of the LEDs in the LED array 425.

In some embodiments, LEDs in the LED array 425 can be arranged in a grid or other two dimensional pattern. Such arrangements of LEDs can creates issues for cameras with image sensors that use a rolling shutter, since each image row is exposed at a different point in time. Accordingly, an arrangement of LEDs in the LED array 425 in single horizontal line ensures that all LEDs are viewed by the same row of pixels, improving the readability of the display.

The LED array may be operated in other modes, such as toggling all-on, all-off, or in patterns other than the one-of-n sequence described above. The all-on/all-off pattern is useful in conjunction with a pulsed audio tone from the speaker 423 as a clapperboard function. For example the speaker 423 can be set to play a brief tone at the same time the LED array turns on. The user uses a test camera to capture a sequence of video (audio and video) which includes the LED array transition and the speaker 423 tone. The user then reviews the captured video to determine which video frame corresponds to the start of the tone. If the camera under test is operating correctly, the tone should start playing in the same video frame that the LEDs are first seen illuminated. If there is a problem with the camera's audio synchronization, the tone will start playing in either a earlier or later video frame.

The characterization system 101 may also use speaker 423 for providing audio feedback and cues on system state and status. The speaker 423 may also be used in conjunction with the LED array 425, light sensor LEDs 427, or display backlight 429. Some video camera tests require testing the synchronization between the audio and video capture. By generating tones or other sounds synchronized with changes in the LED array 425, light sensor LEDs 427, or display backlight 429, the user can identify and measure audio/video synchronization. This is the electronic equivalent of a clapperboard.

The LED array 425 may operate continuously or in a one-shot mode. In one-shot mode an external trigger many be used to synchronize the LED array 425 operation with external devices, such as a camera shutter or strobe LED. The LEDs of the LED array 425 brightness may be manually or automatically adjusted with light level.

The memory 421 may include a nonvolatile storage medium for system calibration parameters such as ADC offsets, light sensor 110 gains, and other parameters which vary from component to component. The memory 421 may also hold identifying information such as serial numbers, manufacturing information or other data. In some embodiments, the memory 421 may include a EEPROM.

In one embodiment, the characterization system 101 can include power supply 443 that provides regulated and low-noise power to all other components of the characterization system 101.

In one embodiment, the characterization system 101 may include a battery 440 for portable operation. The battery 440 may include primary cells, which need to be replaced when exhausted. The battery 440 may include rechargeable cells. The characterization system 101 may include battery charging and monitoring circuits 441. The MCU 415 may be able to monitor the charge level of the battery 440 to provide visual and auditory indications, and to control the battery charger 441.

In another embodiment, the characterization system 101 may include a USB interface 430 to connect to a computing device 450 as part of a system for automated light monitoring and lighting control. The characterization system 101 may include an serial port 431 interface (e.g., RS232) to connect to a computing device 450 as part of a system for automated light monitoring and lighting control.

The characterization system 101 may also include a wireless transceiver 433 to connect to a computing device 450 or other device over a wireless network 460.

In some embodiments, measurements of light sensors 110 can be used to automatically adjust the brightness or color of the light sources to achieve a desired scene brightness and lighting color.

All active light sources (i.e., LEDs in the LED array 425, display backlight 429, and light sensor LEDs 427) can include manual or automatic brightness control. In automatic mode, the light sources scale their brightness with the measured scene illumination brightness to remain sufficiently bright as to be clearly visible, and/or to avoid being so bright as to overwhelm or dominate the scene illumination. The display 429 backlight may also be turned off to act as an entirely passive display, lit only by the scene illumination.

In some embodiments, rather than a single central display, the display 417 may include multiple separate displays corresponding to each light sensor to display the current measurement or other information.

The main unit of the characterization system 101 may be connected to a computing device 450 for data logging and monitoring. The computing device 450 may be used as the display 417, with its screen included in the test images.

The LED bar chaser can vary the brightness of individual LEDs, to emphasize certain LEDs. By emphasizing certain LEDs, e.g. every 5th, 10th, 33rd, counting the number of LEDs displayed is easier and faster. This is similar to the way rulers have longer graduations at inch/centimeter intervals or fractional subdivisions of such.

The characterization system may emit a sound (beep, click, or other sound) synchronized with the LED chaser display. These sounds can be used to test and measure audio/video synchronization in video recordings of the device.

The light sensor modules may measure light color in addition to light intensity. At least some of the light sensor modules can report both color uniformity and accuracy relative to a predetermined color. The light sensor modules may contain a battery pack and a wireless interface device, such as wireless transmitter or transceiver. The light sensors can thus transmit their measurements back to the main unit for processing and display.

The display may show data in a machine-readable format, such as 1D bar codes or 2D QR codes. This facilitates automated data gathering through automated character recognition of the captured test images.

The chart holder region can include a shelf, clips, clamps, magnets, or other forms of temporary attachment for holding and supporting the test charts.

The characterization device can turn either its own lights (LEDs, LCD, etc) or an external light source on or off at specific, timed intervals. This can be used to gauge the performance of camera algorithms such as auto-exposure or auto white balance.

Embodiments of the present disclosure can include image/lighting data displayed in the visual representation on a display device that can be captured in test images to improve trackability, sharing, non-synchronization of the meta data.

Embodiments of the present disclosure include an integrated characterization device 101, depicted in FIG. 1. In one embodiment, the characterization device 101 may be, or be included in, a characterization system that can be used to measure and characterize the performance of imaging and/or lighting systems. The characterization device 101 can include a centrally located surface 140 for holding and/or registering one or more test charts (e.g., color charts, color uniformity charts, gray field charts, etc.). To best test and calibrate an imaging system's ability to accurately reproduce a scene, it is often necessary to ensure that the lighting system used in the testing and calibration processes are not skewing the results (i.e., unintended changes of color or uniformity). The characterization device 101 can be used to simultaneously measure/monitor the performance of the lighting system during testing, it can also be used to provide dynamic targets determining timing characteristics.

Figure 4A:
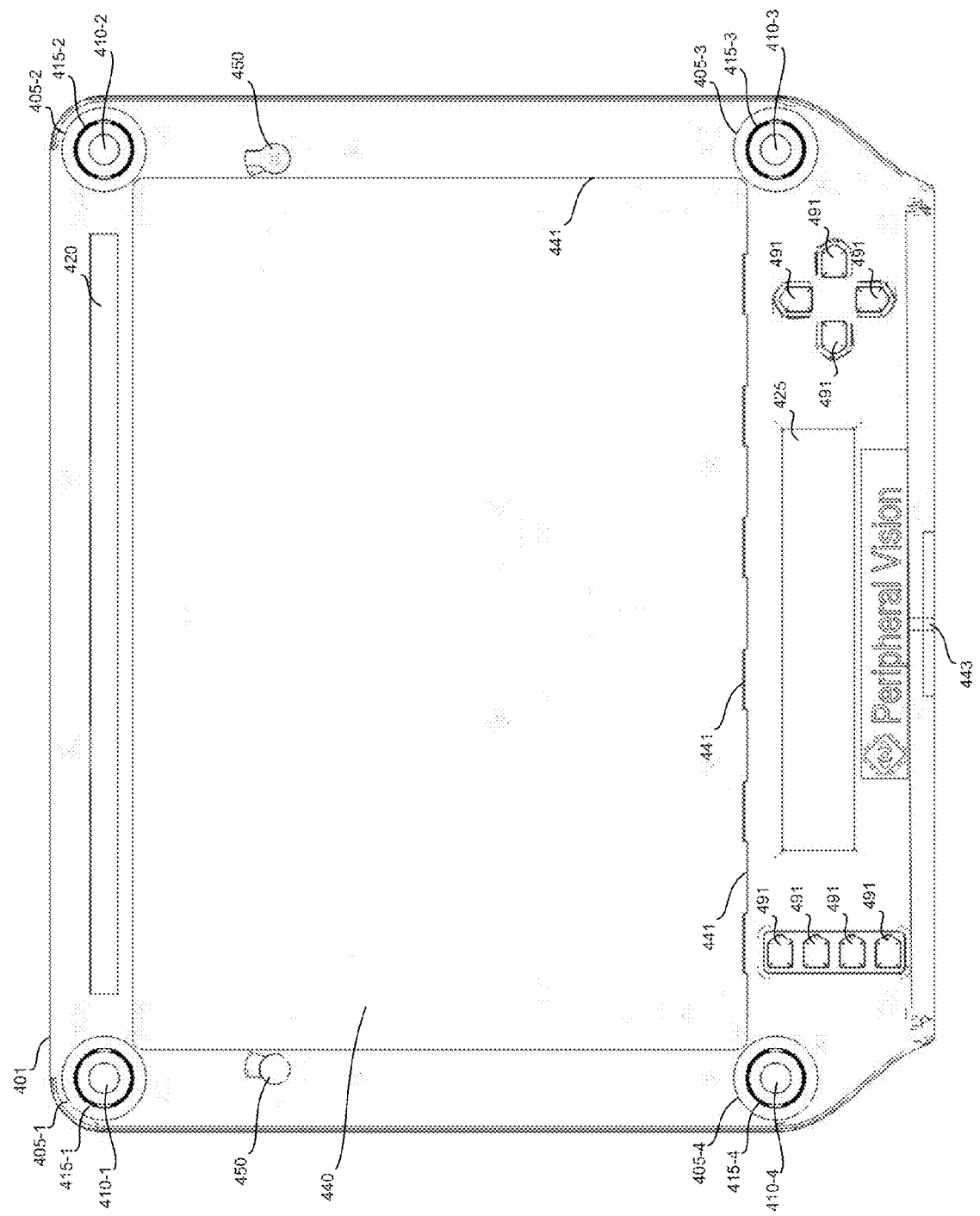
FIG. 4A depicts a characterization device with integrated according to an embodiment of the present disclosure.

FIG. 4A depicts the front of a characterization device 401 and various embodiments of the present disclosure. The specific example shown in FIG. 4A is similar to the embodiment described in reference to FIG. 1A. For example, the characterization device 401 includes a number of light sensor modules 405 disposed of the corners of a test chart holder region 440. The light sensor module 405 may include ring indicators 415 and light sensors 410.

The test chart holder region 440 may include a number of alignment or registration surfaces 441 to hold and outline a test chart disposed in the test chart holder region 441 in the vertical and horizontal directions. In addition, characterization device 401 can also include test chart retention clips 450. The test chart retention clips 450 will be discussed in more detail in reference to FIGS. 5A and 5B.

The characterization device 401 may include a number of controls and keys 491 to receive user input to set various settings and initiate various operations. In addition, the characterization device 401-1 may also include a display 425 and LED array 420. The display 425 and LED array 420 include features and functionality similar to the features and functionality described in reference to the display 125 and LED array 120. In addition, a threaded hole 443 is depicted as being threaded into the bottom of the characterization device 401 so that the entire device can be mounted on a tripod mount with ¼-20 screws.

Figure 4B:
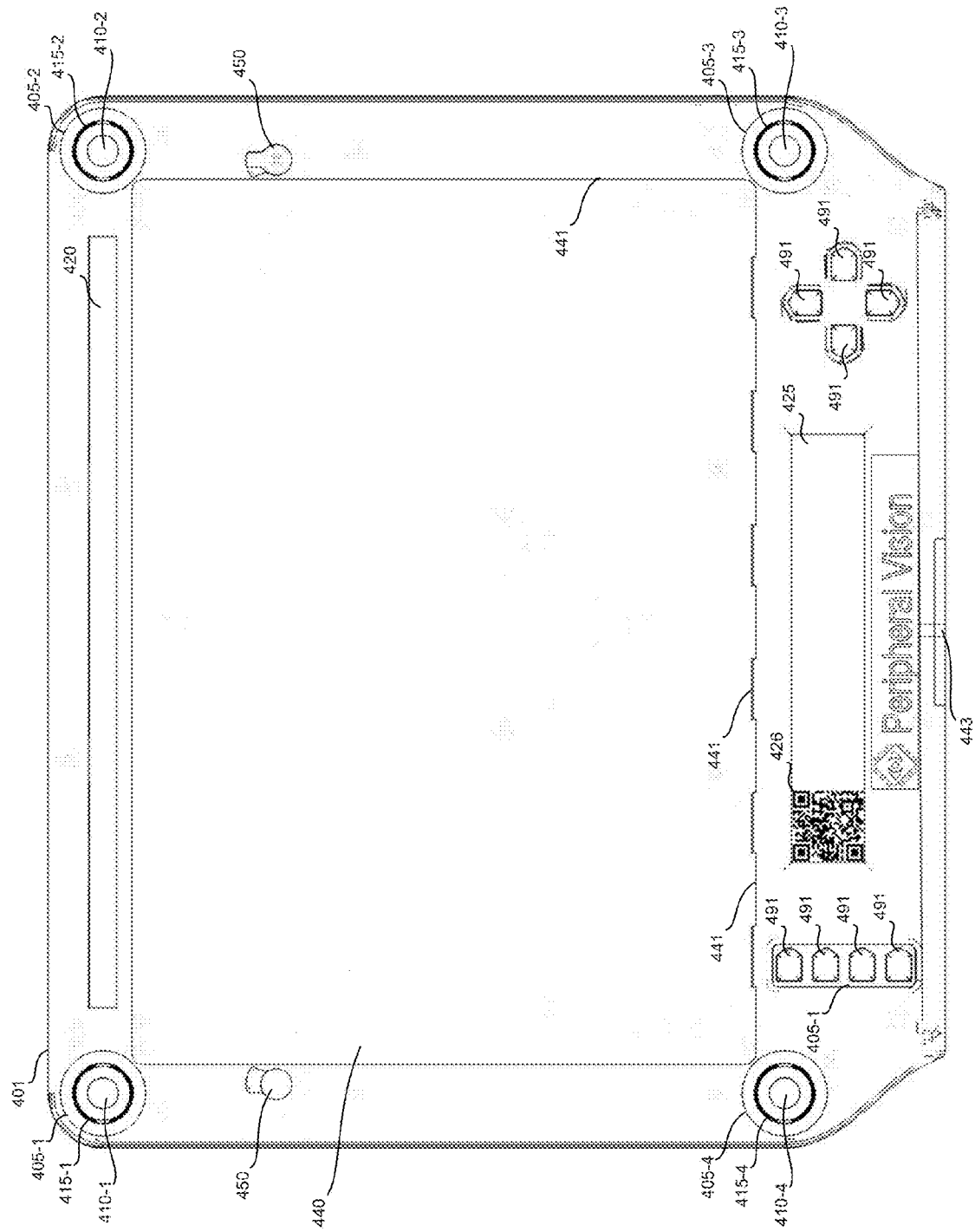
FIG. 4B depicts a characterization device according to an embodiment of the present disclosure.

FIG. 4B depicts the characterization device 401 in which a QR code 426 is displayed in the display 425. The QR code can include or be associated with information regarding the various settings and identification of the characterization device 401, the light sources, or the imaging system. Accordingly, in some embodiments, when an image of a particular test scene is captured, all of the information needed to evaluate or process the image for testing or calibration can be included directly in the image. Such embodiments advantageously allow any downstream user to have all the information they may need to know without referencing metadata which they may or may not have access to.

Figure 4C:
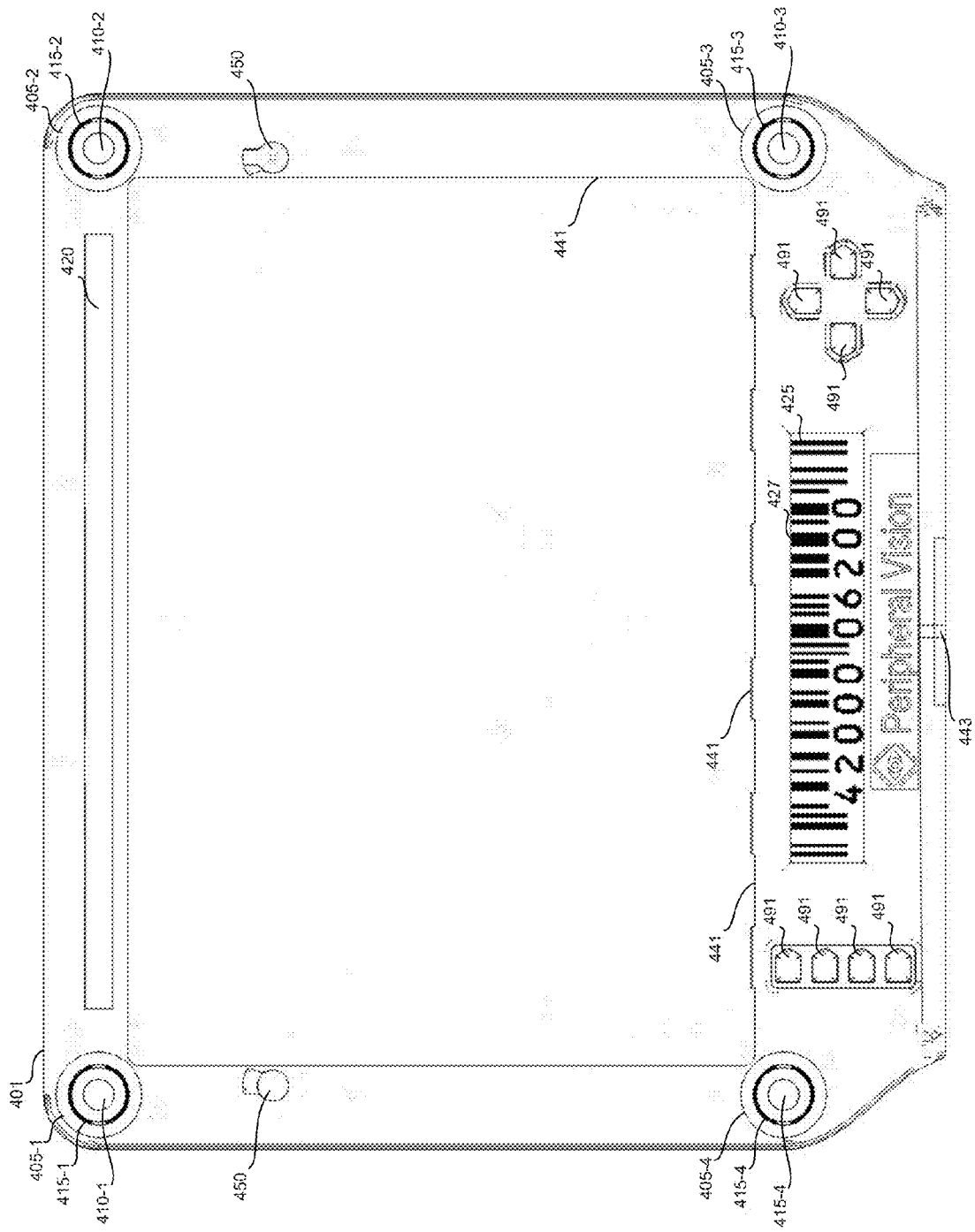
FIG. 4C depicts a characterization device according to an embodiment of the present disclosure.

Alternatively, the QR code 426 can provide a link to an internal or secured data store that can include all of the metadata needed for analyzing or processing the image of the testing. Similarly, as depicted in FIG. 4C, the display 425 may display a barcode 427. The barcode 427 may include an identifier that can be associated with metadata associated particular test scene image stored in a central data store. Alternatively, the barcode 427 may include encoded metadata regarding the testing image.

Figure 5A:
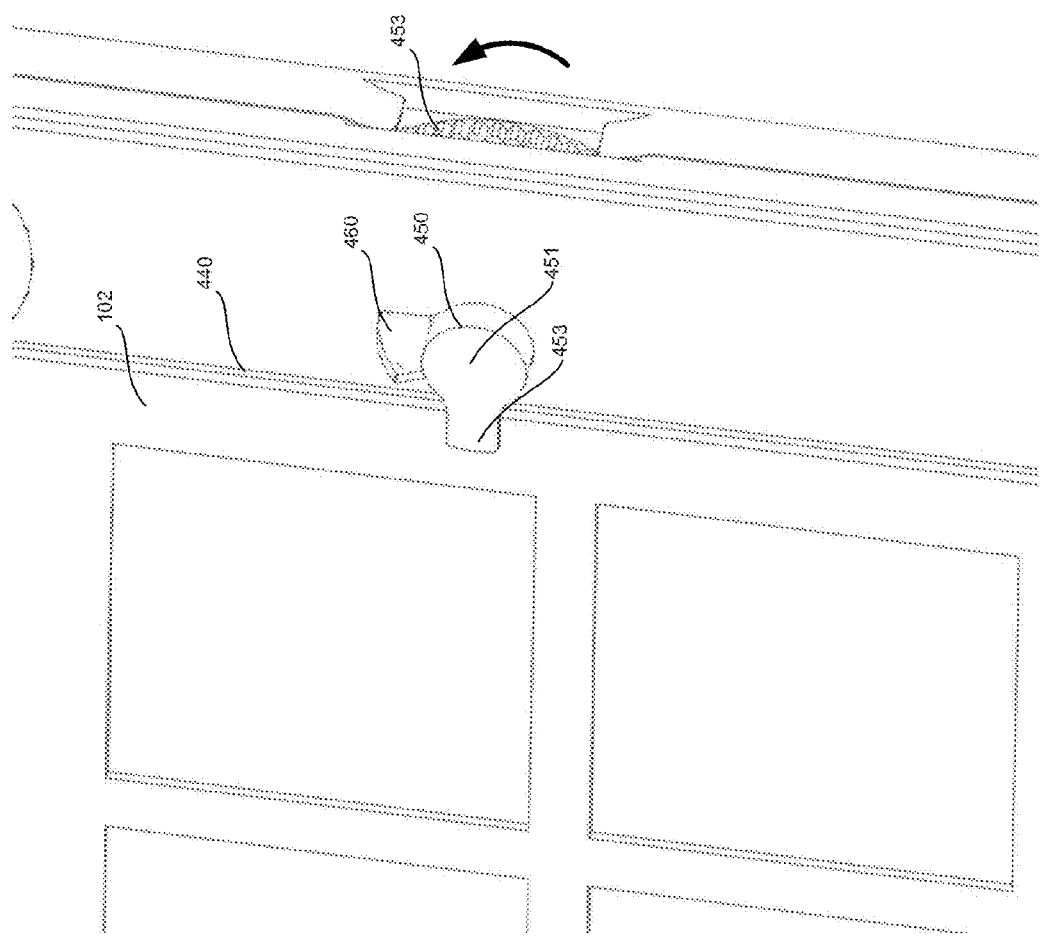
FIG. 5A depicts a detail view of a retractable chart registration clip in an engaged position according to an embodiment of the present disclosure.

FIG. 5A is a detailed view of the retention clip 450 that surrounds the test chart region 440 in the engaged position, according to various embodiments of the present disclosure. As illustrated in FIG. 5A, the test chart retention clip 450 may include a retention arm 453 extending from a main body portion 451. In the engaged position, the main body portion 451 and the retention arm 453 are rotated to dispose the retention arm 453 over the test chart 102 disposed in the test chart region 440. In some embodiments, rotating the main body portion 451 and the retention arm 453 into the engaged position is achieved by rotating the thumbwheel 455. To disengage the retention arm 453 from the test chart 102, the thumbwheel 455 may be rotated in the opposite direction. As the thumbwheel 455 is rotated in the direction depicted in FIG. 5B, the retention arm 453 rotates and recesses into the recessed region 460. In the disengaged position depicted in FIG. 5B, the test chart 102 may be removed from the test chart region 440. The retention clip 450 when in the disengaged position, is flush with the surrounding services to avoid interfering with any oversized test charts that may not fit in the test chart region 440.

Figure 6:
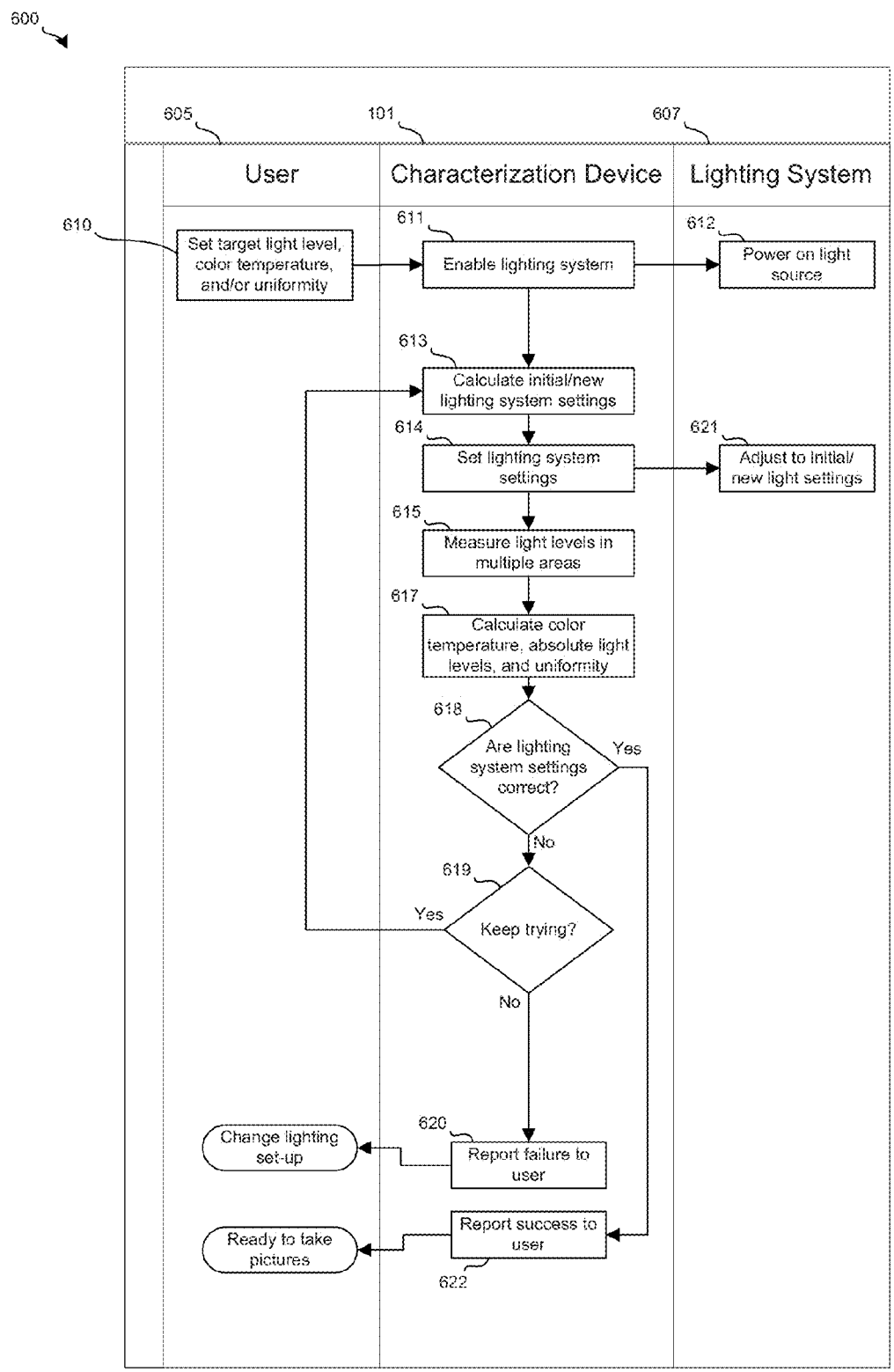
FIG. 6 depicts a flowchart of a method for characterizing a lighting system according to an embodiment of the present disclosure.

FIG. 6 is a flowchart of a method 600 for evaluating a lighting system or other light source using a characterization device 601, according to various embodiments of the present disclosure. For the purposes of illustration, actions of a user 605 are described. However various embodiments of the present disclosure may be achieved using the functionality of the characterization device 605 and/or functionality that controls the characterization device 605 implemented in a computing device. Accordingly, various embodiments of the present disclosure include some or all of the actions described in reference to FIG. 6 being automated by the characterization device 600 one or an associated computing device.

In one embodiment, a user 605 may enter a target light level, color temperature, and/or uniformity setting in the characterization device 601. Accordingly, characterization device 605 may receive the light level, color temperature, color coordinates, tolerance, and/or uniformity settings. In such embodiments, the uniformity and tolerance settings may apply to the light level settings, the color temperature or coordinates settings, or both. The characterization device 601 may receive the settings through one or more user interface devices. For example, characterization device 601 may receive the settings through the integrated controls 491 and menus displayed in the display device 425. In other embodiments, the characterization device 601 may receive some or all of the settings from a computing device through wired or wireless connection. The computing device can communicate using a standard or proprietary communication protocol to send settings and commands to and receive measurement and other signals and data from characterization device 601. In one embodiment, a computing device may generate a graphical user interface (GUI) displayed on the corresponding display device to receive settings, then control signals, and display measurements and calculated values determined by the characterization device 601. The GUI may include a representation of the characterization device 601 with controls and data fields that mirror or are analogous to the controls 491 and display devices 425 and 420. In such embodiments, the characterization device 601 may be operated remotely by a user 605 using a computing device, such as a desktop computer, tablet computer, smart phone, and the like.

In response to the settings, the characterization device 601 enables the lighting system 607 by sending a command signal, in action 611. The characterization device 601 may be the command signal to the lighting system 607 directly or to the computing device, which in turn sends the command signal to the lighting system 607. The lighting system 607 may include any manual, automated, or semi automated lighting system used to illuminate a scene. For example, in an automated lighting system 607, the positions, color temperature, intensity, and configuration of multiple lamps may be automatically set based on default settings or settings sent to the lighting system 607. Alternatively, the various positions, color temperature, intensity, and configuration of multiple lamps can all be set manually by the user 605.

In response to the command signal received from the characterization device 611 or corresponding computing device, the lighting system 607 may power on one or more lamps or light sources, in action 612. When powering on the light sources, the lighting system 607 may initiate a warm-up routine to stabilize the light output of the light sources to minimize any inconsistencies or transient conditions associated with changes in the operating temperature.

In action 613, the characterization device 601 can calculate one or more initial settings for the lighting system 607 based on the received target light level, color temperature, and/or uniformity settings. In one embodiment, the characterization device 601 may include a lighting system configuration file containing characteristics and configuration settings and well and communication protocols for the lighting system 607. The lighting system configuration file may include specifications about the individual light sources (e.g., the size, color temperature, location, number, and direction of the lamps) in the lighting system 607. In one embodiment, the lighting system configuration file may include lamp type identifiers and/or the age of the lamps. Information about the lamp type identifiers and the age can then be used by the characterization device 601 to reference an internal or external data store to determine lamp typical lamp characteristics and aging profiles. The characterization device 601 may use the lighting system configuration file to calculate an initial set of lighting system settings to achieve the target light level, color temperature, and/or uniformity settings.

Once the initial set of lighting system settings are calculated, the characterization device 601 may set the lighting system settings in action 614. In one embodiment, setting the lighting system settings may include sending a control signal to the lighting system 607 to automatically make adjustments to set the initial lighting system settings, in action 621. In other embodiments, setting lighting system settings may include displaying the settings to user on one of the displays of the characterization device 601. The user 605 can then use the lighting system settings to manually adjust the lighting system 607.

In action 615, the characterization device 601 can measure the light levels in multiple areas of a particular test scene using multiple light sensors. In one embodiment, measuring the light levels may include detecting illuminance or brightness. In such embodiments, the illuminance may be measured in lux or lumens per square meter. In one embodiment, measuring the light levels may include detecting the color of the illumination.

In action 617, the characterization device 601, can use the measurements received from the light sensors to calculate the color temperature or coordinates, the overall or absolute light levels, and the uniformity in one or more dimensions. For example, the characterization device 601 may use the detected color of the illumination from some or all of the light sensors to calculate overall color temperature of the fields of illumination. Similarly, the characterization device 601 may combine the light level readings from some or all of the light sensors to generate a composite light level measurement that generally describes the overall level of illumination of the lighting system 607. In addition, the characterization device 601 can compare the light level and color measurements from some or all light sensors in their respective known locations within the field of illumination to calculate light level and color uniformity. The uniformity of the light level in color may be expressed as a percentage difference over the field of illumination or as a relative difference between measurements made by light sensors and opposing locations. For example, the characterization device 601 may calculate differences between the measurements made by light sensors in opposing corners of a particular test chart.

In determination 618, the characterization device 601 can compare the target light level, color temperature, and/or uniformity settings with the actual measurements and calculated values to determine if the lighting system settings are correct. If the measured overall light level, color temperature, and uniformity or within tolerances, then the characterization device 601 may determine that the lighting system settings are correct and report success to the user, in action 622. Reporting success to the user may include display a visual indication that the light levels, color temperature, and uniformity within tolerances. The visual indication may include a large "OK" or green light on the characterization device 601. Alternatively, visual indication may include illuminating or not illuminating the ring indicators according to a predetermined scheme.

However, if in determination 618, the characterization device 601 determines that the lighting system settings are not correct, then the characterization device 601 may then determine if the user or an appropriate configuration setting indicates whether not the process should reattempt to adjust the light system settings, in determination 619. If the reattempt is approved, then the characterization device 601 can iteratively repeat actions 613 through 618 to adjust the lighting system settings to get the resulting lighting conditions to match the target settings as closely as possible within the predetermined tolerances.

If in determination 619 the characterization device 601 determines that the rate is not approved, the characterization of a 601 may report failure to the user in action 622. Reporting failure to the user may include display a visual indication that the light levels, color temperature, and uniformity not within tolerances. The visual indication may include a large "FAIL" or a red light on the characterization device 601. Alternatively, visual indication may include illuminating or not illuminating the ring indicators according to a predetermined scheme. In one embodiment, the visual indication of failure may include illuminating one or more of the ring indicators associated with a particular light sensor that is measuring light levels or color temperature that are causing the uniformity or overall light levels to be outside of the predetermined tolerances.

Figure 7:
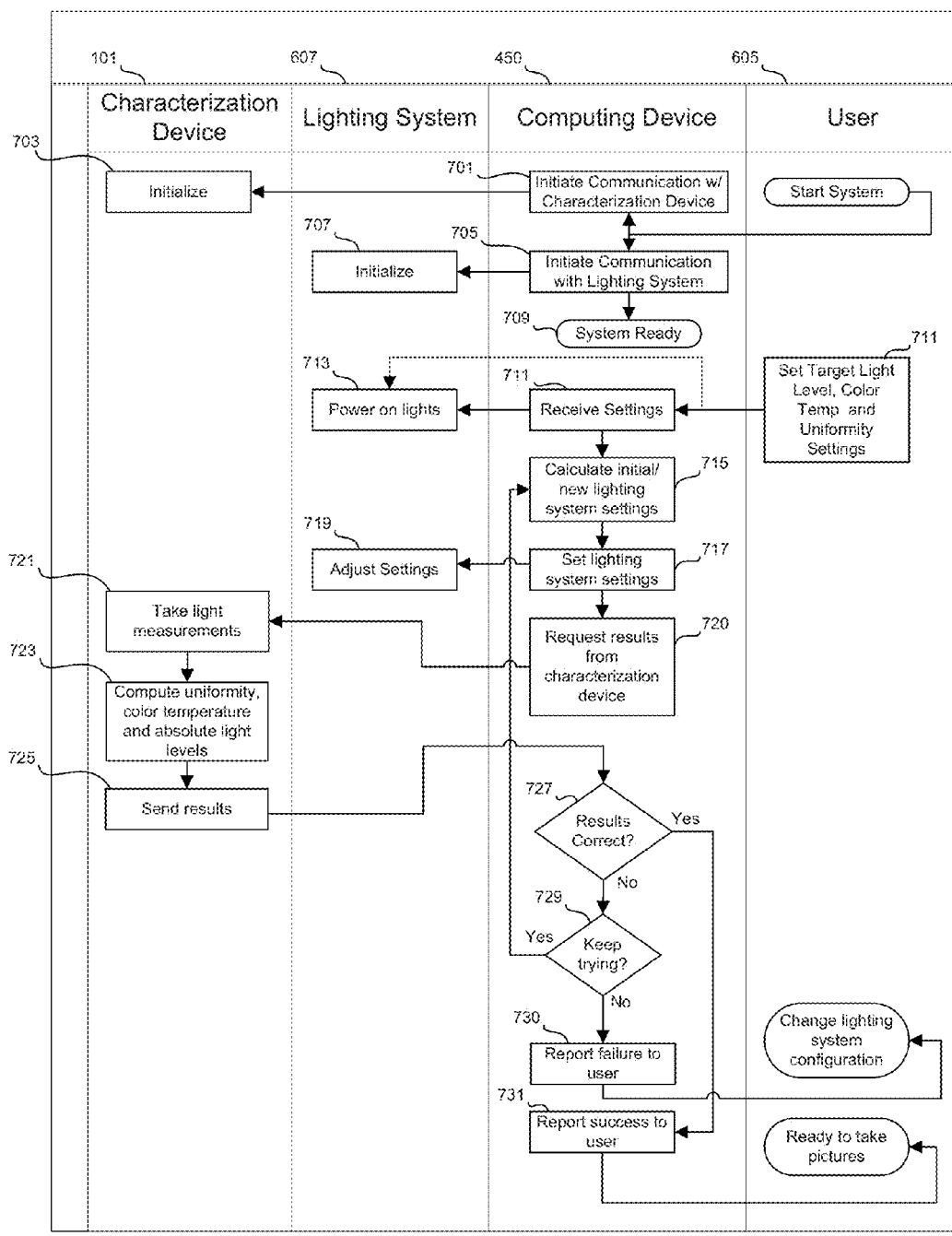
FIG. 7 depicts a flowchart of a method for characterizing a lighting system according to an embodiment of the present disclosure.

FIG. 7 is a flowchart of a method 700 for evaluating a lighting system or other light source using a characterization device 101 and a computing system 450.

In one embodiment, the method 700 can begin in response to start input from a user 605. In one embodiment, the start input can include initiating the execution of an application on the computing device 450. Accordingly, in response to the input or action that starts or powers the system, the computing device 450 can initiate communication with the characterization device 101. As described herein, the communication with characterization device 101 can occur over one or more wired or wireless communication or networking media or protocols.

In response to the initialization communication from computing device 150, the characterization device 101 can execute one or more initialization routines.

In action 705, the computing device 450 can initiate communication with the lighting system 607. Communication with the lighting system 607 can occur over one or more standardized or proprietary communication or networking protocols or media. In response to the initialization communication from the computing device 450, the lighting system 607 can execute one or more initialization routines, in action 707.

Once the computing device 450 is in communication with the characterization device 101 and the lighting system 607, device may go into a system ready status 709. At this point, the computing device 450 is ready to receive input from a user 605.

At 710, a user may determine a target set of light level, color temperature, and uniformity settings. In action 711, the computing device 450 may receive settings through a user interface, such as a GUI analogous to the controls available on one or more of the embodiments of characterization device 101 described herein. In response to receiving settings, the computing device may also send a control signal to the lighting system 607 causes it to power on various light sources and lamps, in action 713.

In action 715, computing device 450 can calculate initial lighting system settings based on the specifications of the lighting system 607 and the target settings. In some embodiments, the specifications laid in system 607 may be included in a lighting system configuration file accessible to the computing device 450. In such embodiments, the computing device 450 can calculate the initial set of lighting system settings based on the target settings and the lighting system configuration file.

The lighting system configuration file may include specifications about the types of light sources, the age of light sources, this physical configuration of the light sources, and the like. In one embodiment, the lighting system configuration file may include a lookup table that correlates specific lighting system settings with expected lighting outputs. In one embodiment, lookup table may also include expected age-based lighting output. Accordingly, embodiments in which the lighting system configuration file includes actual or estimated ages of the particular light sources are lamps in the lighting system 607, expected lighting levels and color temperatures can be calculated based on the lighting system configuration file.

In action 717, the computing device 450 can set the lighting system settings. One embodiment, signaling system settings can include sending one or more control signals to the lighting system 607. In response to the control signals, the lighting system 607 can adjust the settings, and action 719. When adjusting the settings of the lighting system 607, the illumination field may be immediately changed in accordance with the settings. In other embodiments, the settings are realized when the lighting system 607 is triggered, such as when a shutter release or image capture command is sent to lighting system 607.

In action 720, the computing device 450 can request the results from the characterization device. The question result in the characterization device 101 can include sending a request command signal to the characterization device 101. In response to the request command signal, the characterization device 101 may take measurements using multiple light sensors 110, in action 721. One or more of the light sensors 110 can measure the illuminance and/or the color temperature of the illumination field at one or more locations within a particular scene. The measurements can be associated with an identifier for the corresponding light sensors 110. In one embodiment, the measurements can also be associated with a particular location within a test scene or illumination field.

Based on the measurements from the light sensors 110 in the known locations of the sensors, the characterization device 101 can compute the uniformity, color temperature, and the absolute light levels for a particular section or region of the illumination field in which the light sensors 110 are disposed, in action 723.

In action 725, the characterization device 101 can send the calculated uniformity, color temperature, and/or the absolute light level results back to the computing device 450, in action 725.

The computing device 450 can compare the results to the target settings to determine whether not the results are correct, in determination 727. Determining whether the results are correct can involve analyzing the results in view of predetermined tolerances. If the results are within the predetermined tolerances, then the results can be determined to be correct. If the results are out to the predetermined tolerances, the results can be determined to be incorrect.

When the results are correct, the computing device 450 can report success to the user in action 731. In one embodiment, reporting success to the user may include displaying the results with indications that they are all within tolerances. When the results or incorrect, the computing device 450 can determine whether or not it should continue to attempt to adjust the lighting system settings in determination 729. In one embodiment, computing device 450 may prompt the user to approve every attempt at adjusting the lighting system settings. In another embodiment, computing device 415 may access the configuration file to determine a maximum number of attempts that it should attempt before generating a failure report. The maximum number of attempts may range from 0 to N, where N is a natural number.

If in determination 729, the computing device 450 determines it should continue to trying to adjust the lighting system settings, then the computing device 450 can repeat steps 715, 717, 720, in determination 727 and 729 for as long as the user approves three attempts or according to the maximum number of attempts allowed defined in the configuration file. Accordingly, the computing device 450 can iteratively adjust the lighting system settings until the resulting uniformity, color temperature, and absolute light levels match the target settings within the predetermined tolerance.

If, however, the computing device 450 determines that it should not continue in determination 729, and then it can report a failure to user in action 730. The failure can include displaying the results to the user with indications regarding which of the results are outside of the tolerances relative to the target settings. For example, the results that fail may be highlighted in a contrasting color (e.g., flashing red background).

Figure 8:
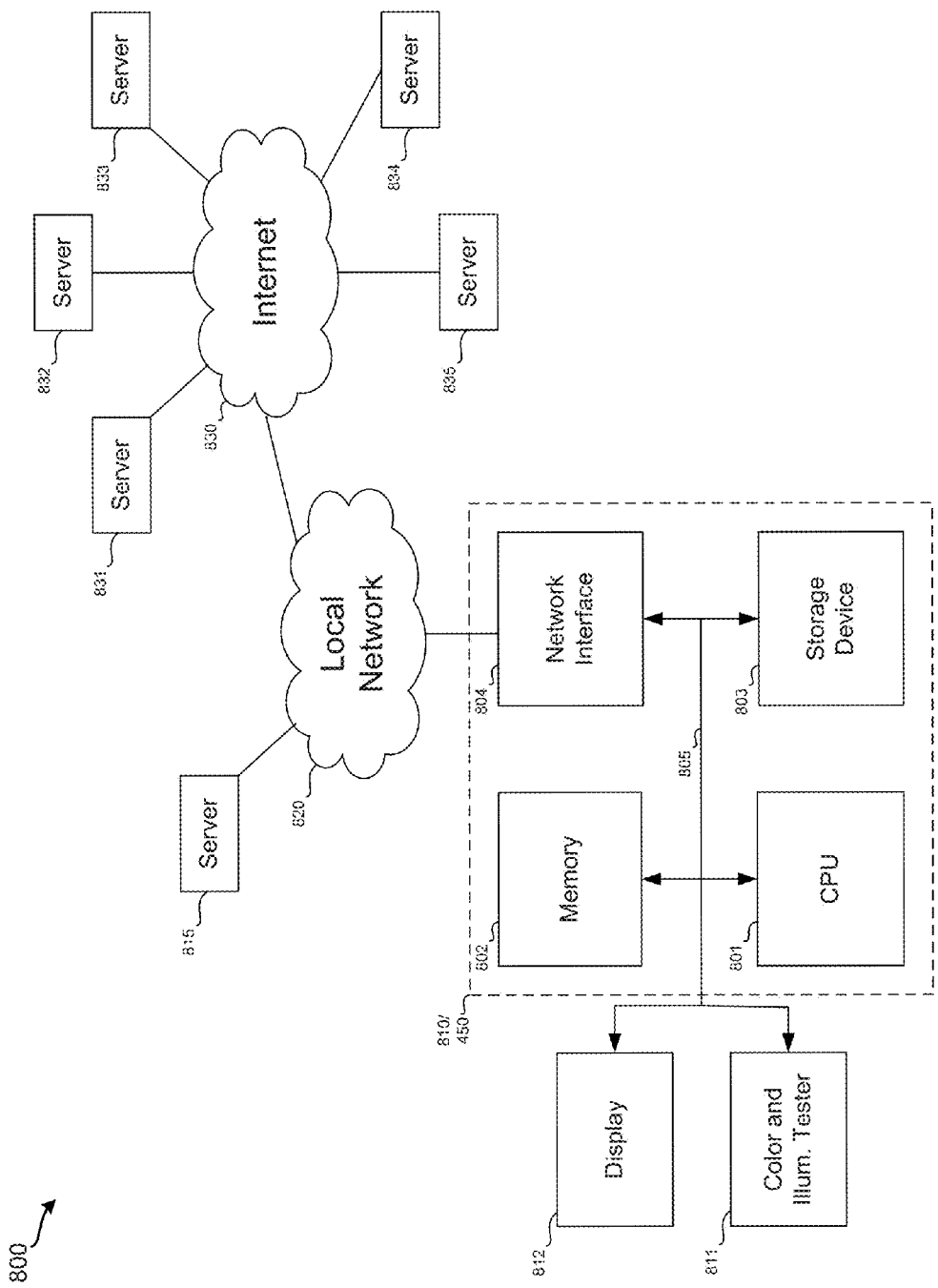
FIG. 8 is a block diagram of a computer system and network of computers and servers that can be used to implement or control various embodiments of the present disclosure.

An example computer system 810 is illustrated in FIG. 8. The computing device 450, the characterization devices 101, characterization device main body modules 201/202, and other elements of the claimed disclosure can be implement with or in components similar to those described in reference to computer system 810. Computer system 810 can include a bus 805 or other communication mechanism for communicating information, and a processor 801 coupled with bus 805 for processing information.

Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both.

A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read.

Storage device 803 may include source code, binary code, or software files for performing the techniques above, for example. Storage device and memory are both examples of computer readable media.

Computer system 810 may be coupled via bus 805 to a display 812, such as a cathode ray tube (CRT) or liquid crystal display (LCD), for displaying information to a computer user. An color and illumination tester 811, such as those described herein, is coupled to bus 805 for communicating information and command selections from the user and/or sensor to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 1010 and the local network 820. The network interface 804 may be for Broadband Wireless Access (BWA) technologies. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein.

In an example involving the Internet, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. An illumination characterization system comprising:
a main body module comprising a display device; and
a plurality of light sensor modules coupled to the main display module;
wherein the display device displays information comprising measurements made by at least one of the plurality of light sensors modules;
wherein each of the light sensor modules comprises a light sensor;
wherein at least one of the light sensor modules comprises an indicator for indicating a condition measured by the corresponding light sensor; and
wherein the indicator comprises one or more LEDs disposed around the light sensor in a ring or other configuration.

2. The illumination characterization system of claim 1 wherein at least one light sensor comprises a photodiode.

3. The illumination characterization system of claim 1 wherein the plurality of light sensor modules are flexibly coupled to the main body module via a plurality of wired connections, wherein the main body module sends control signals to and receives measurement signals from the plurality of light sensor modules through the plurality of wired connections.

4. An illumination characterization system comprising:
a main body module comprising a display device; and
a plurality of light sensor modules coupled to the main display module;
wherein the display device displays information comprising measurements made by at least one of the plurality of light sensors modules;
wherein the main body module comprises a test chart holder to accept a test chart;
wherein the light sensor modules are coupled to the perimeter of the test chart holder; and
wherein the test chart holder comprises one or more registration surfaces to align the test chart.

5. An illumination characterization system comprising:
a main body module comprising a display device; and
a plurality of light sensor modules coupled to the main display module;
wherein the display device displays information comprising measurements made by at least one of the plurality of light sensors modules;
wherein the plurality of light sensor modules comprises a plurality of wireless communication interfaces,
wherein the main body module comprise a wireless communication interface to establish a plurality of wireless communication sessions with the plurality of sensor modules through the plurality of wireless communication interfaces, and
wherein the main body module sends control signals to and receives measurement signals from the plurality of light sensor modules through the plurality of wireless communication sessions.

6. An illumination characterization device comprising:
a plurality of light sensors;
a display device;
an LED array configured to illuminate in sequence;
a processor coupled to the display device and connected to the plurality of lights sensors; and
a non-volatile storage medium coupled to the processor, wherein the non-volatile storage medium comprises instructions, that when executed by the processor, cause the processer to be configured for:
controlling the plurality of lights sensors to take one or more light measurements;

analyzing the one or more light measurements to generate light measurement results; and rendering a visual representation of the measurement results on display device.

7. The illumination characterization device of claim 6 wherein the light measurement results comprise a description of a composite illuminance measurement comprising an illuminance measurement from at least some of the plurality of light sensors.

8. The illumination characterization device of claim 6 wherein the light measurement results comprise a description of a uniformity of a lighting system.

9. The illumination characterization device of claim 6 wherein the light measurement results comprise a color characterization of a lighting system.

10. The illumination characterization device of claim 9 wherein the light measurement results further comprise a color correction information for changing the color characterization of the lighting system.

11. An illumination characterization device comprising:
    a plurality of light sensors;
    a display device;
    a processor coupled to the display device and connected to the plurality of lights sensors:
    a non-volatile storage medium coupled to the processor, wherein the non-volatile storage medium comprises instructions, that when executed by the processor, cause the processer to be configured for:
        controlling the plurality of lights sensors to take one or more light measurements;
        analyzing the one or more light measurements to generate light measurement results; and
        rendering a visual representation of the measurement results on display device,
    a plurality of indicators coupled to the processor;
    wherein each indicator in associated with one of the plurality of light sensors, and wherein the instructions further cause the processor to be configured for:
    receiving one or more target settings;
    generating a comparison between the one or more target setting with the one or more light sensors for one or more of the plurality of light sensors; and
        operating the indicators in accordance with the comparisons wherein the plurality of indicators comprise a plurality of LED ring lights disposed around the plurality of light sensors.

\* \* \* \* \*